(12) United States Patent
Bergsten et al.

(10) Patent No.: US 12,415,577 B2
(45) Date of Patent: Sep. 16, 2025

(54) OUTDOOR POWER EQUIPMENT VEHICLE ADAPTED FOR PERFORMING WORK OPERATIONS ON TURF SURFACES

(71) Applicant: The Toro Company, Bloomington, MN (US)

(72) Inventors: Rex R. Bergsten, Burnsville, MN (US); Kelly S. Meemken, Savage, MN (US); Jackie R. Gust, Northfield, MN (US); Garrett V. Pommeranz, Eden Prairie, MN (US); Brandon J. Anderson, Savage, MN (US); Jeffrey J. Barkow, Bloomington, MN (US); David J. Scherbring, Savage, MN (US)

(73) Assignee: The Toro Company, Bloomington, MN (US)

( * ) Notice: Subject to any disclaimer, the term of this patent is extended or adjusted under 35 U.S.C. 154(b) by 1544 days.

(21) Appl. No.: 16/479,133

(22) PCT Filed: Feb. 7, 2018

(86) PCT No.: PCT/US2018/017210
§ 371 (c)(1),
(2) Date: Jul. 18, 2019

(87) PCT Pub. No.: WO2018/148268
PCT Pub. Date: Aug. 16, 2018

(65) Prior Publication Data
US 2019/0389519 A1 Dec. 26, 2019

Related U.S. Application Data

(60) Provisional application No. 62/455,951, filed on Feb. 7, 2017.

(51) Int. Cl.
*B62D 49/06* (2006.01)
*A01B 45/02* (2006.01)
(Continued)

(52) U.S. Cl.
CPC ........ *B62D 49/0671* (2013.01); *A01B 45/026* (2013.01); *A01B 51/026* (2013.01);
(Continued)

(58) Field of Classification Search
CPC ....... A01B 45/00; A01B 45/02; A01B 45/026; A01B 39/085; A01B 9/00; A01B 33/00;
(Continued)

(56) References Cited

U.S. PATENT DOCUMENTS 3,633,679 A * 1/1972 Dahlberg ............. A01B 33/021
172/417
4,362,340 A 12/1982 van der Lely
(Continued)

FOREIGN PATENT DOCUMENTS

JP 2006-123724 A 5/2006

OTHER PUBLICATIONS

Combined Search and Examination Report for Application No. GB2218485.7 mailed Jan. 25, 2023.
(Continued)

*Primary Examiner* — Jamie L McGowan
(74) *Attorney, Agent, or Firm* — Merchant & Gould P.C.

(57) ABSTRACT

A vehicle combining the attributes of a tractor and a utility vehicle includes a three point linkage and other locations to which a plurality of attachments for performing grooming or working operations on a ground or turf surface may be couple. The vehicle includes a front mounted engine, a mid-mounted operator compartment and a rear mounted bed or box. A PTO shaft and/or a hydraulic power system of the vehicle power attachments that require power. A control system and a visual display and data entry device linked thereto are provided for allowing an authorized person to setup, store and thereafter use an operational profile for each attachment that is to be coupled to the vehicle. In a rate
(Continued)

dependent attachment, the control system maintains the ground speed and the attachment implement in a fixed ratio. A down/up control is used to signal the start and end of an operational sequence to the control system.

17 Claims, 11 Drawing Sheets

(51) Int. Cl.
  *A01B 51/02* (2006.01)
  *A01B 59/06* (2006.01)
  *B60K 35/10* (2024.01)
  *B60K 35/22* (2024.01)
(52) U.S. Cl.
  CPC ........ *A01B 59/067* (2013.01); *B62D 49/0621* (2013.01); *B60K 35/10* (2024.01); *B60K 35/22* (2024.01)
(58) Field of Classification Search
  CPC .... A01B 39/166; A01B 51/026; A01B 59/067
  See application file for complete search history.

(56) References Cited

U.S. PATENT DOCUMENTS

| | | | |
|---|---|---|---|
| 4,518,044 A * | 5/1985 | Wiegardt | A01B 67/00 172/3 |
| 4,541,491 A * | 9/1985 | van der Lely | A01B 13/00 172/19 |
| 4,566,553 A | 1/1986 | McCutcheon | |
| 5,417,193 A * | 5/1995 | Fillman | F02D 31/007 123/352 |
| 5,514,048 A | 5/1996 | Jacobson et al. | |
| 5,647,441 A | 7/1997 | Gibbons | |
| 5,911,769 A | 6/1999 | Orbach et al. | |
| 6,061,617 A * | 5/2000 | Berger | E02F 3/438 701/34.2 |
| 6,246,128 B1 * | 6/2001 | Sugata | B60Q 1/425 200/61.54 |
| 7,044,257 B2 | 5/2006 | Kempf et al. | |
| 7,630,793 B2 * | 12/2009 | Thomas | E02F 9/26 701/50 |
| 7,845,457 B2 * | 12/2010 | Baluch | B60K 20/06 180/336 |
| 7,971,653 B2 * | 7/2011 | Harris, III | A01B 79/005 172/3 |
| 8,347,529 B2 * | 1/2013 | Berg | E02F 5/145 37/348 |
| 9,706,696 B2 * | 7/2017 | Gschwendtner | F16H 61/4043 |
| 10,143,125 B2 * | 12/2018 | Schleyer | A01B 63/112 |
| 2003/0051470 A1 * | 3/2003 | Maddock | E02F 9/226 60/368 |
| 2003/0173133 A1 | 9/2003 | Kempt et al. | |
| 2006/0129280 A1 * | 6/2006 | Thomas | E02F 9/2029 700/275 |
| 2008/0183356 A1 * | 7/2008 | Kale | E02F 9/2029 172/7 |
| 2013/0154339 A1 * | 6/2013 | Darscheid | E01C 23/12 172/123 |
| 2014/0343802 A1 | 11/2014 | Pichlmaier | |
| 2016/0029542 A1 * | 2/2016 | Gschwendtner | A01B 63/10 701/50 |
| 2016/0029543 A1 * | 2/2016 | Stich | A01B 63/112 701/50 |
| 2016/0088787 A1 * | 3/2016 | Connell | A01B 63/24 701/33.9 |
| 2017/0101103 A1 * | 4/2017 | Foster | A01B 63/11 |

OTHER PUBLICATIONS

International Search Report and Written Opinion for Application No. PCT/US2018/017210 mailed May 18, 2018.

* cited by examiner

OUTDOOR POWER EQUIPMENT VEHICLE ADAPTED FOR PERFORMING WORK OPERATIONS ON TURF SURFACES

TECHNICAL FIELD

This invention relates to an outdoor power equipment vehicle that is adapted for use on turf surfaces for performing various operations needed for establishing, maintaining and renovating such turf surfaces.

BACKGROUND OF THE INVENTION

Tractors are well known for performing various agricultural operations on farm fields. These operations involve tilling the soil, planting seeds, applying fertilizer to the growing crop, and finally harvesting the crop. Such tractors are also versatile by incorporating a rear three point hitch and a power take off (PTO) at the front or rear or both ends thereof. This allows many different types of attachments to be used in conjunction with the tractor to perform many different types of agricultural operations. Moreover, the tractor is powered by an engine typically having from 20 to over 600 horsepower to be able to push or pull heavy loads in difficult terrain or soil conditions.

In addition, in order to allow such a tractor to also perform some functions of a truck, tractors have been additionally designed to carry a rear mounted bed or box for containing and transporting various materials therein. Such materials could be transported on the tractor to a desired location and then be dumped from the bed or box in the manner of a dump truck. One such combined tractor and truck is disclosed in U.S. Pat. No. 5,647,441. A similar commercially available combined tractor and truck is known as the Tructor®.

However, such tractors are not well suited for operating on turf surfaces characterized by a surface planted with grass, such as the fairways and tees of golf courses, parks and other large common areas in cities or on commercial properties, sport fields, and the like. The tires, the weight distribution, the two or four wheel mechanical traction drive system, and the steering geometry of a typical tractor are prone to damaging or tearing up turf surfaces. In addition, it can be difficult to maneuver tractors in small spaces without turf damage. Accordingly, utility tractors have limited use for performing operations on turf surfaces due to turf damage.

Instead, the outdoor grounds maintenance industry has developed various specialized utility vehicles, such as the Toro® Workman®, that perform various operations required on turf surfaces without damaging the turf surface. These small utility vehicles have a front operator compartment that carries a driver and a passenger in a side-by-side seating arrangement. A bed is provided on the vehicle behind the operator compartment for carrying various equipment, supplies, tools, and the like, which are useful in establishing, maintaining, renovating and grooming landscapes and ground or turf surfaces. Various turf grooming or working attachments, such as sprayers, mowers, spreaders, topdressers, aerators, and the like, may be coupled to or carried on the vehicle according to the operation the user wishes to perform.

While utility vehicles of this type are turf friendly, they have their own drawbacks. For one thing, they are generally underpowered for performing some types of operations. For example, utility vehicles do not have enough power to transport heavy loads or to adequately drive certain attachments. In addition, they lack the standard three point linkage found on an agricultural tractor. Thus, while performing well on turf surfaces, utility vehicles cannot crossover and perform the types of operations typically performed by tractors. Accordingly, grounds maintenance users who typically operate on turf surfaces but who might have other surfaces that would benefit from a larger tractor would need to purchase and have on hand both types of vehicles.

The need for both types of vehicles is obviously disadvantageous in terms of the cash costs to purchase and maintain both types of vehicles, one for use on turf surfaces and another for use on non-turf surfaces. In addition, it poses various problems in terms of the training and expertise required from the operators to properly and safely operate both vehicles. Separate operators might well be required for each type of vehicle. Thus, there is a need in the grounds maintenance art to provide a single vehicle having the power and versatility attributes of a small tractor combined with the turf friendly attributes of a utility vehicle. This invention is directed to that need.

SUMMARY OF THE INVENTION

One aspect of this invention relates to an outdoor power equipment vehicle for performing grooming or working operations on a ground or turf surface. The vehicle comprises a frame carrying a prime mover and being supported for movement over the ground by a pair of front wheels and a pair of rear wheels. At least one pair of wheels is steerable and at least one pair of wheels is driven by a traction drive system powered from the prime mover. The frame has a three point linkage for carrying a rate dependent attachment whose operation on the surface is dependent upon maintaining a ground speed of the vehicle in a fixed relationship to an operational speed of an implement on the attachment that performs the operation on the surface. A control is manually operable by an operator of the vehicle to send a first signal and a second signal. A control system receives the first and second signals and automatically maintains the fixed relationship between the ground speed and operational speed of the implement between receipt of the first and second signals.

Another aspect of this invention relates to an outdoor power equipment vehicle for performing grooming or working operations on a ground or turf surface. The vehicle comprises a front end that carries a prime mover, an operator compartment behind the prime mover, and an area behind the operator compartment on which a bed or box may be mounted. The frame is supported for movement over the ground by a pair of front wheels and a pair of rear wheels. At least one pair of wheels is steerable and at least one pair of wheels is driven by a traction drive system powered from the prime mover. The frame has a plurality of locations including at least a three point linkage and at least one other location for mounting a plurality of attachments to the frame with the attachments having different implements for performing different grooming or working operations on the surface. A microprocessor based control system stores a menu based, interactive setup procedure to allow an authorized person to setup each of the attachments for use on the vehicle by creating an operational profile for each attachment. The control system runs such setup procedure when an authorized person signals to the control system that the authorized person wishes to setup a particular attachment. A visual display and data input device is operatively linked to the microprocessor for displaying on a screen to the authorized person a plurality of choices that must be made and a plurality of operational parameters that must be set by the authorized person for the particular attachment to be operated by the vehicle. The visual display and data entry device has data entry inputs that must be manipulated by the authorized person in conjunction with information displayed on the screen to select a desired choice or set a desired value for a parameter. The selections and settings entered by the authorized person are communicated back to and are stored in the control system in the operational profile for the particular attachment for subsequent use by the control system whenever the particular attachment is coupled to the vehicle.

Yet another aspect of this invention relates to an outdoor power equipment vehicle for performing grooming or working operations on a ground or turf surface. The vehicle comprises a frame carrying a prime mover. The frame is supported for movement over the ground by a pair of front wheels and a pair of rear wheels. At least one pair of wheels is steerable. The pairs of front and rear wheels are driven by a hydraulic drive system powered from the prime mover through a front hydraulic traction circuit and a rear hydraulic traction circuit, respectively. The front and rear traction circuits are independent of one another. An attachment is coupled to the frame for performing a grooming or working operation on a ground or turf surface. A control system is provided for controlling pressure in the front and rear traction circuits to achieve a targeted ground speed with both circuits targeting pressure that produces equal torque to the respective front and rear pairs of wheels being driven thereby. The control system monitors through a feedback control loop either the pressure in the traction circuits or the torque driving the front and rear pairs of wheels to detect a misbalance therebetween and then adjusts the pressure in at least one of the traction circuits in a manner that returns the circuits to balance therebetween.

An outdoor power equipment vehicle for performing grooming or working operations on a ground or turf surface. The vehicle comprises a frame carrying a prime mover. The frame is supported for movement over the ground by a pair of front wheels and a pair of rear wheels. At least one pair of wheels is steerable by an operator through the operation of a steering wheel. At least one pair of wheels is driven by a traction drive system powered from the prime mover. The frame has a three point linkage for carrying an attachment for performing the grooming or working operations on a ground or turf surface. The three point linkage is capable of being raised and lowered relative to the frame by at least one actuator carried on the frame and coupled to the three point linkage. A control is adjacent the steering wheel and is manually operable by an operator of the vehicle to raise and lower the three point linkage by up and down motions of the control respectively. The control is positioned beneath the steering wheel and is close enough to a rim of the steering wheel that the operator may actuate the control in both its up and down motions using one or more fingers on one hand of the operator that is gripping the rim of the steering wheel without releasing the one hand of the operator from the rim of the steering wheel.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
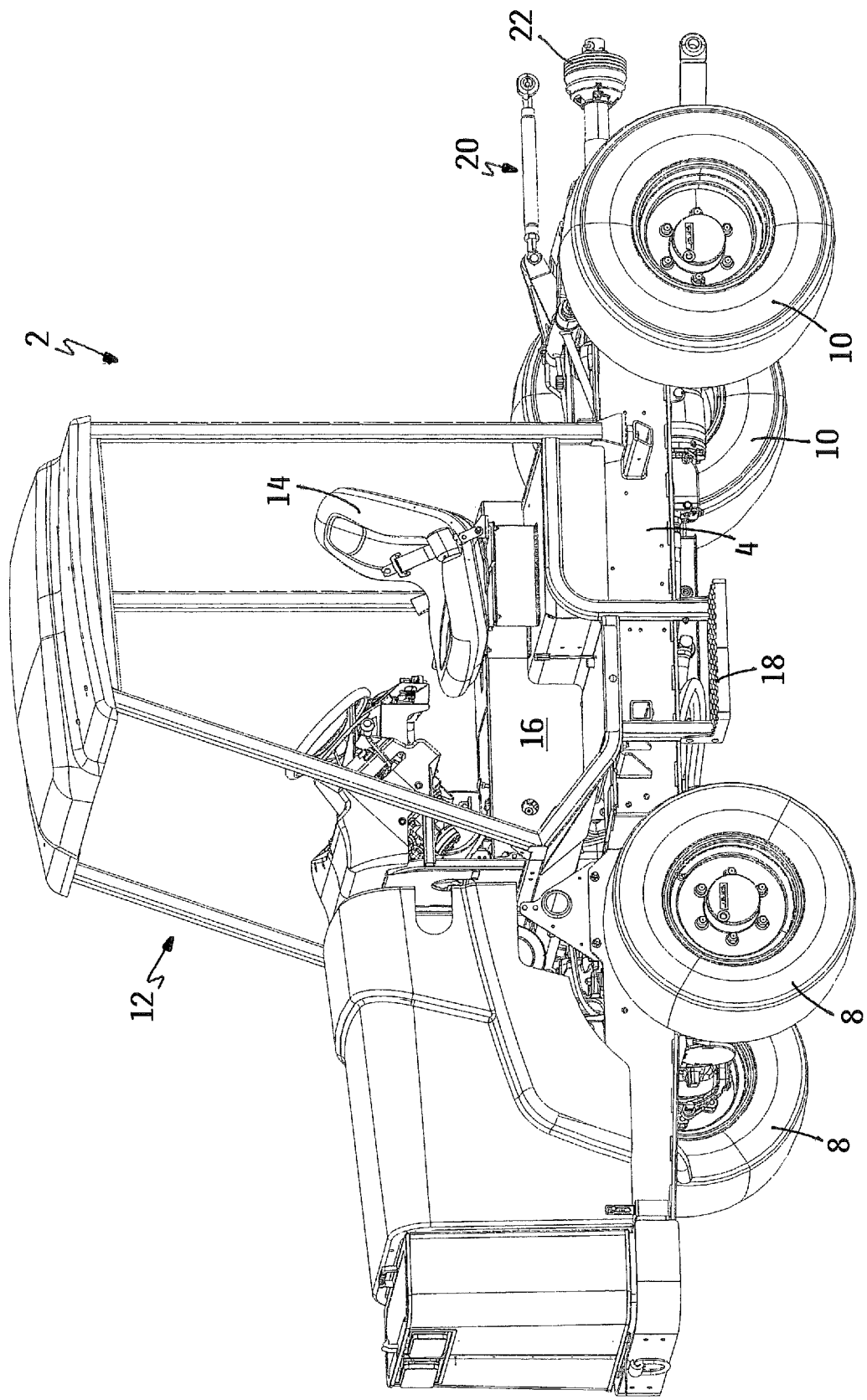
FIG. 1 is a front perspective view of one embodiment of an outdoor power equipment vehicle according to this invention.

One embodiment of an outdoor power equipment vehicle 2 according to this invention is illustrated in FIG. 1. In the context of this invention, the term "vehicle" is intended to cover a mobile, self-propelled machine that is controlled by an operator who is directly carried on the vehicle in a seated or standing position, or who is supported on a trailing sulky or similar device, or who stands or walks on the ground adjacent to the vehicle during some operations, or who operates the vehicle remotely. In other words, the "vehicle" need not necessarily directly carry the operator though it is preferred that it do so.

Figure 3:
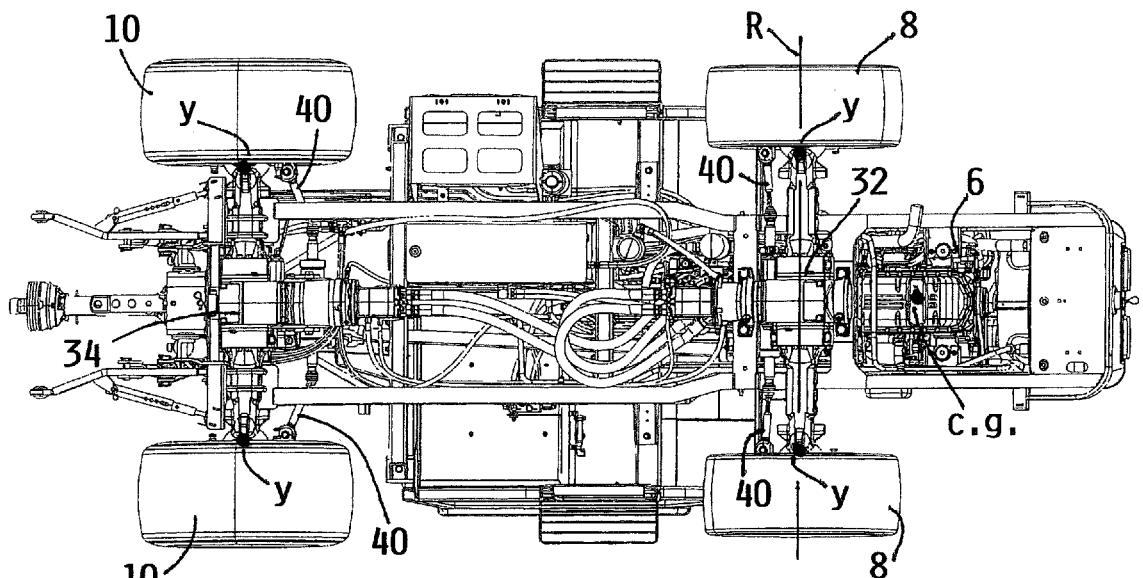
FIG. 3 is a bottom plan view of the vehicle of FIG. 1.

Vehicle 2 comprises a chassis 4 that supports a prime mover such as but not limited to a front mounted engine 6. While engine 6 may have various sizes, an engine in the 40 to 74 horsepower range is preferred. Chassis 4 is supported for rolling over the ground by a pair of front wheels 8 and a pair of rear wheels 10. Vehicle 2 of this invention places engine 6 more forwardly on chassis 4 than does a Workman® utility vehicle. As shown in FIG. 3, the center of gravity (e.g.) of engine 6 is forward of the laterally extending rotational axis R of front wheels 8 when vehicle 2 is traveling straight ahead.

Figure 2:
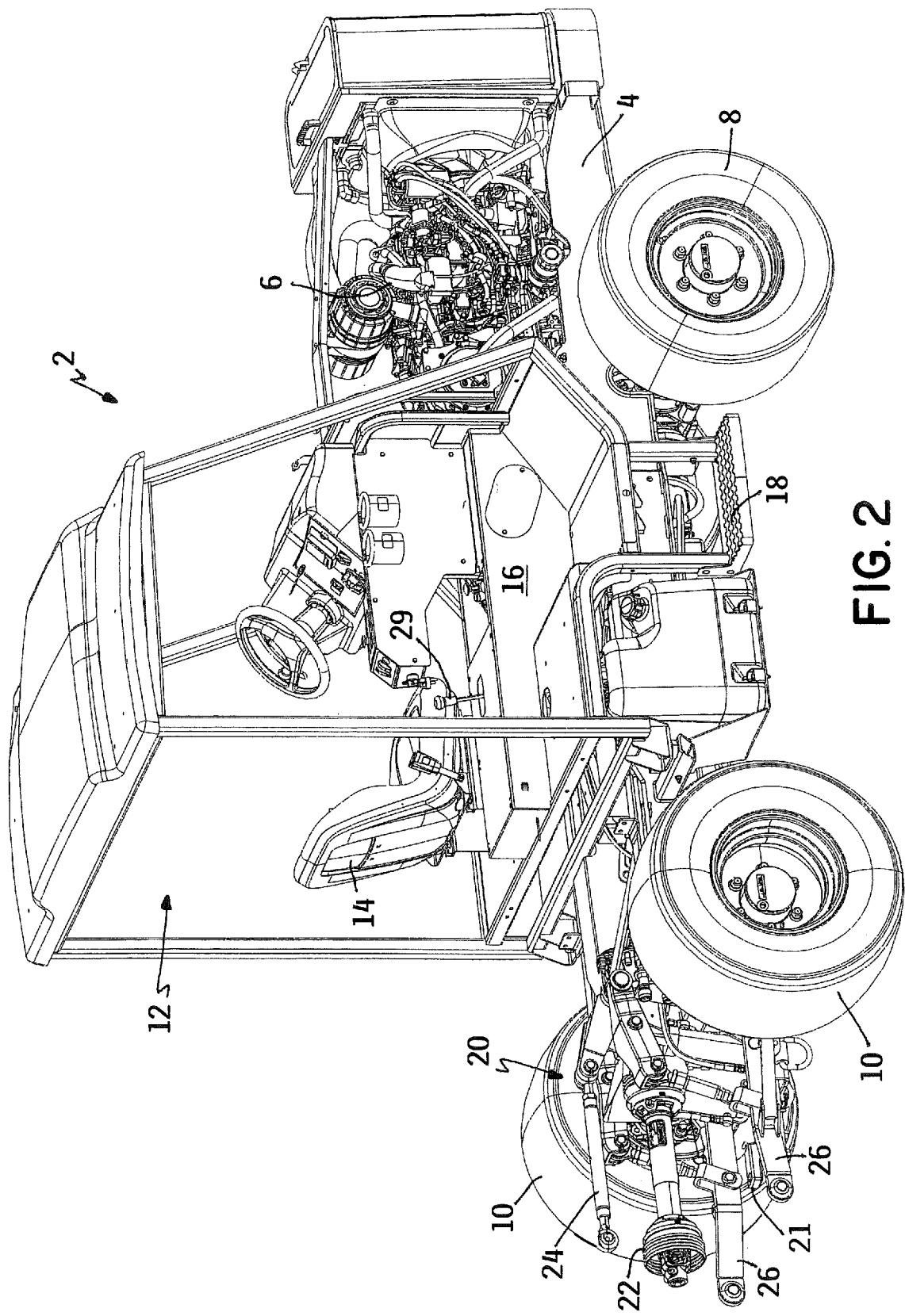
FIG. 2 is a rear perspective view of the vehicle of FIG. 1, with the engine hood removed therefrom to particularly illustrate the front mounted engine of the vehicle.

An operator compartment 12 is preferably located on chassis 4 behind front wheels 8 and between front and rear wheels 8, 10. Operator compartment 12 includes an operator seat 14 on which the operator sits while driving vehicle 2 and/or while operating any attachments. As best shown in FIG. 2, operator compartment 12 includes a center console 16 with operator seat 14 being positioned on one side thereof, such as the left side. Operator compartment 12 includes enough room on the other side of center console 16 for mounting a second seat (not shown in FIG. 2) to allow vehicle 2 to carry a passenger along with the operator. The addition of a second seat to conveniently carry a passenger is another distinction between vehicle 2 of this invention and a typical tractor in this power range. Each side of vehicle 2 includes a step 18 for allowing the operator and the passenger if present to conveniently step up into operator compartment 12 to reach their respective seats. As further shown in FIGS. 2 and 3, operator compartment 12 terminates forwardly of rear wheels 10 of vehicle 2.

A standard three point linkage 20 is carried on the rear of chassis 4. Linkage 20 is a typical three point linkage having a top central link 24 and a pair of lower laterally spaced links 26 that are pivotally connected to the rear of chassis 4. The rear ends of the top and lower links 24, 26 have pivot connections for allowing various attachments to be mounted thereto either directly or through some type of quick attach mounting system. One or more hydraulic cylinders (not shown) coupled to three point linkage 20 and powered by a hydraulic system (not shown) on vehicle 2 allow the operator to lower and raise the attachment into and out of a working position, respectively. As shown in FIG. 2, a drawbar 21 is also mounted on the rear of chassis 4 for towing some types of attachments behind vehicle 2.

Figure 9:
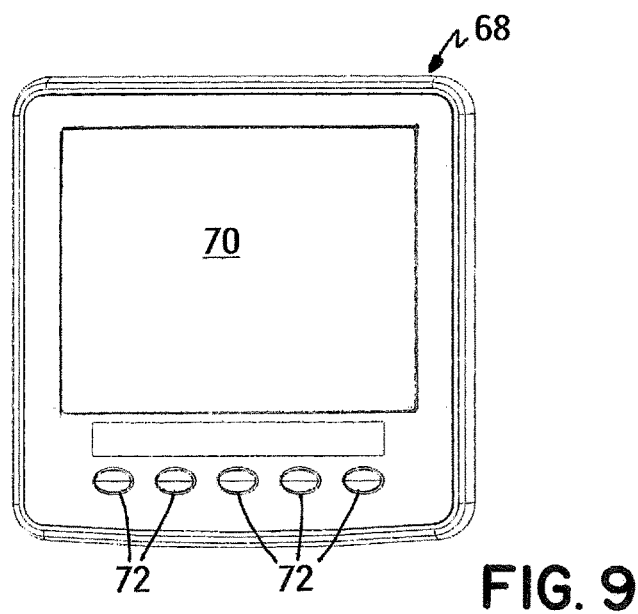
FIG. 9 is a top plan view of an information center comprising both a visual information display and a data entry device.

A power takeoff shaft (PTO) 22 is also carried on the rear of chassis 4. PTO 22 provides a mechanical source of power that can be used to power or drive an attachment when one is mounted on three point linkage 20. PTO 22 can be manually engaged and disengaged by the operator using a PTO switch 23 in the operator compartment (See FIG. 9) when operating some types of attachments. In addition to being manually controlled, PTO 22 is further automatically engaged and disengaged by a control system 35, a portion of which is shown in FIG. 9, when operating other types of attachments as will be described in more detail hereafter.

Control system 35 comprises one or more microcomputer based electronic control units (ECU). By way of example only, control system may comprise a master ECU (not shown) that controls and coordinates the operation of other subsidiary ECUs which serve to control the operation of various components on vehicle 2 after receiving operational instructions from the master ECU. Referring to FIG. 9, the portion of control system 35 that can be seen is a subsidiary ECU 33 that controls the operation of engine 6. In some cases, such subsidiary ECU's may be integrated into the components they control, such as a motor controller that is often built into the motor it controls. Additionally, the ECU's that form the control system may have two way communications with one another.

In addition, vehicle 2 also carries a hydraulic system of a type well known in the art to provide pressurized hydraulic fluid through connecting hoses for powering the traction drive system of vehicle 2 and for powering any hydraulically powered components which are present on any attachment that is coupled to vehicle 2, e.g. the hydraulic lift and lower cylinders of a loader having a dump bucket, or the hydraulic motors powering the cutting blades of a mower, etc. In this latter regard, the hydraulic system of vehicle 2 includes one or more sets of hydraulic hose connectors, such as the set of connectors 28a, 28b at the rear of vehicle 2 as shown in FIG. 2, for powering any hydraulically powered components or implements on a rear mounted attachment. The hydraulic system of vehicle 2 may also include a similar set of hydraulic hose connectors (not shown) at the front of vehicle 2 in substitution for or in addition to the rear connectors 28a, 28b for powering any hydraulically powered components or implements on a front mounted attachment, such as the aforementioned loader. The hydraulic system and/or the hydraulic flow therethrough can be manually activated and deactivated either in a work mode or a float mode by a hydraulic system lever 29 in the operator compartment (See FIG. 2) or automatically by control system 35. Movement of lever 29 out of neutral additionally provides infinitely adjustable rates of hydraulic flow through the hydraulic system depending on how far lever 29 is moved.

The term "attachment" as used herein is intended to refer to a device or assembly that carries an implement or implements for performing a ground or turf grooming or working operation. There are many types of such attachments well known in the ground and turf maintenance art. Vehicle 2 is intended to mount and operate most or all of these attachments.

Figure 5:
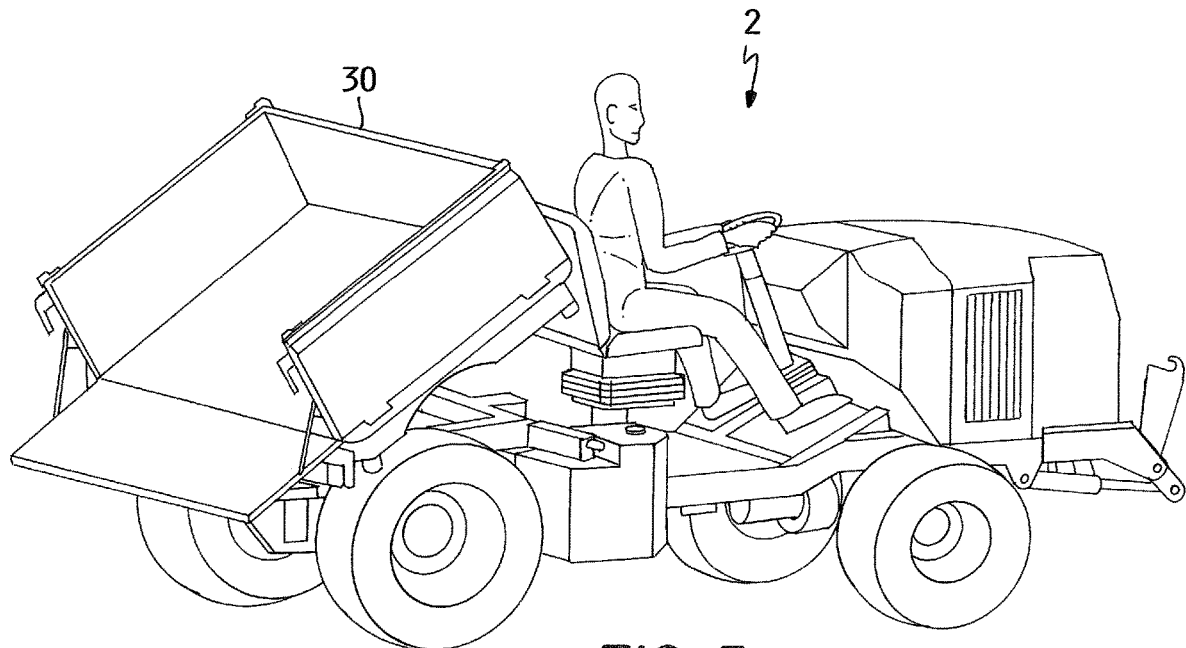
FIG. 5 is a diagrammatic view of the vehicle of FIG. 1, particularly showing a dump box carried thereon which dumps to the rear.
Figure 6:
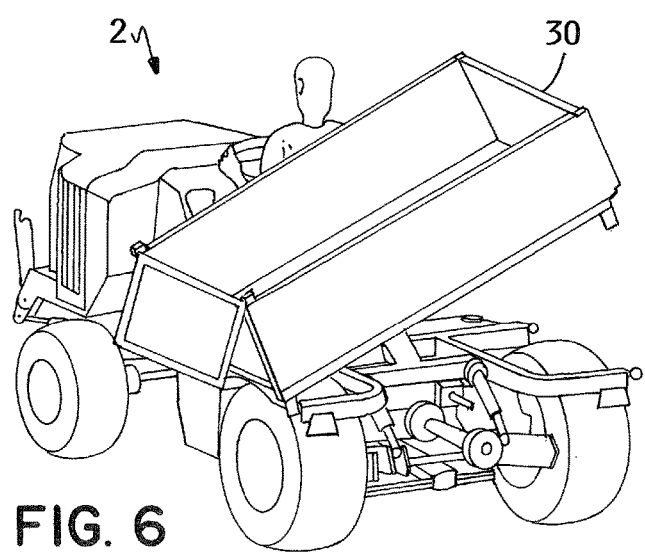
FIG. 6 is a diagrammatic view similar to FIG. 5, but showing a dump box which dumps to the side.

As shown in FIGS. 5 and 6, the space between the rear end of operator compartment 12 and the rear end of chassis 4 can be utilized for the installation of a dump bed or box 30 thereon. As shown in FIG. 5, dump box 30 can be arranged to dump to the rear. Alternatively, as shown in FIG. 6, dump box 30 can be arranged to dump to the side. Vehicle 2 can be built and supplied to a customer with either style of dump box being permanently carried thereon depending upon the customer's wishes. Alternatively, dump box 30 can be made to be quickly installable or removable from the rear end of chassis 4 to allow a customer to have both types of dump boxes on hand to permit the customer to switch between the two dump boxes when one is more useful than the other for a particular task.

As a further alternative, a dump box 30 could be preinstalled on the rear of chassis 4, either permanently or removably, that would permit the same dump box to dump either to the rear or to the side. In this situation, dump box 30 would be carried on a subframe (not shown) that is pivotal relative to chassis 4 about a longitudinal fore-and-aft axis along one side of chassis 4. The subframe and its fore-and-aft pivot would additionally be carried on a main frame (not shown) that is pivotal relative to chassis 4 about a laterally extending axis along the rear end of chassis 4. To dump to the rear, the main frame would be elevated by one or more first actuators (not shown) to rotate both the main frame, the subframe and dump box 30 together upwardly about the rear pivot of the main frame to chassis 4 to allow the material contained in dump box 30 to flow outwardly to the rear thereof through a rear tailgate. To dump to the side, the main frame would not be elevated but would remain in place on chassis 4 in a horizontal position. One or more second actuators (not shown) pivotally connected between the main frame and the subframe would be used to rotate only the subframe and dump box 30 carried thereon about the fore-and-aft pivot of the subframe to the main frame to allow the material contained in dump box 30 to flow outwardly to the side thereof through a side tailgate. The appropriate tailgate would be unlocked, either manually or automatically, depending upon whether the operator wishes to dump to the rear or to the side. Side dump and rear dump could be reversed in this design as to which is on the main frame and which is on the subframe.

Turning now to FIG. 3, vehicle 2 has a four wheel drive hydraulic traction system that comprises a front electronically controlled hydrostatic axle 32 and a rear electronically controlled hydrostatic axle 34 that drive front wheels 8 and rear wheels 10, respectively. Each axle 32, 34 has left and right output shafts that provide a differential action during turns of vehicle 2 between the left and right wheels in each pair of wheels 8, 10. Axles 32, 34 are electronically controlled by control system 35. As the operator presses down on an accelerator pedal 36 in operator compartment 12, control system 35 receives a speed signal input from a sensor associated with accelerator pedal 36. Control system 35 separately controls the front and rear axles to provide a ground speed as set by the position of accelerator pedal 36.

In addition, vehicle 2 has a four wheel steering system that provides steering during turns of vehicle 2. The steering system is controlled by the operator through manipulation of the steering wheel 38 in operator compartment 12. Front wheels 8 and rear wheels 10 are each individually pivotal for steering purposes about generally vertical axes indicated at y in FIG. 3 under the control of individual steering linkages 40 which are controlled by the position of steering wheel 38. Preferably, the steering system is designed to provide vehicle 2 with Ackerman type steering in which the individual wheels turn at different angles during a turn. This keeps each wheel 8, 10 turning about a common point to minimize the turning radius without damage to the turf.

The Applicants have also found that damage to the turf can be minimized and vehicle 2 can maintain more efficient traction by continuously balancing the pressure between front and rear axles 32, 34. The front and rear hydraulic traction circuits are independent from each other. Each traction circuit has its own speed feedback, pressure feedback, current feedback and hydraulic supply circuit. When the operator presses accelerator pedal 36 to propel vehicle 2, the front and rear traction circuits are instructed by control system 35 to target the same ground speed and maintain the same ground speed, regardless of the drive ratios for each circuit. Since the front and rear hydraulic traction circuits are independent from each other, tolerance stack up, tire pressure, rolling radius of a tire, weight distribution on vehicle 2 (heavy front or rear attachment), and the difference in front to rear turning radius could result in one of the axles doing more work than the other. As a result, while both axles 32, 34 are producing the same ground speed, various misbalance scenarios can arise, e.g. the rear traction circuit could be solely responsible for propelling vehicle 2 while the front axle is asserting an unnecessary load onto the system (or vice versa).

To overcome this problem, each axle 32, 34 can include a hydraulic pressure sensor (not shown) linked to control system 35 for continuously reporting to control system 35 the hydraulic pressure in the corresponding traction circuit. Control system 35 constantly monitors the front and rear hydraulic traction pressures. If one traction circuit is doing more work than the other, the traction pressure of that circuit will be higher. Control system 35 will compensate by causing the lagging axle having the lower pressure to do more work while reducing the work load in the other axle. As a result, the front and rear traction circuits will be kept in balance and produce less turf damage as compared to hydrostatic traction drive systems without such compensation.

Such a traction pressure compensation or balancing feature would be useful on its own even without four wheel steering. However, when the traction pressure balancing feature is provided in an addition to a four wheel steering system, as in one embodiment of the present invention, the result is a vehicle that has been optimized for operations on a turf surface. With both features in place, front and rear wheels 8, 10 of vehicle 2 are both steered and driven in a manner that substantially reduces the possibility of gouging, tearing or scuffing of the turf surface while maintaining substantial traction in difficult conditions such as turning while driving+downhill.

Figure 7:
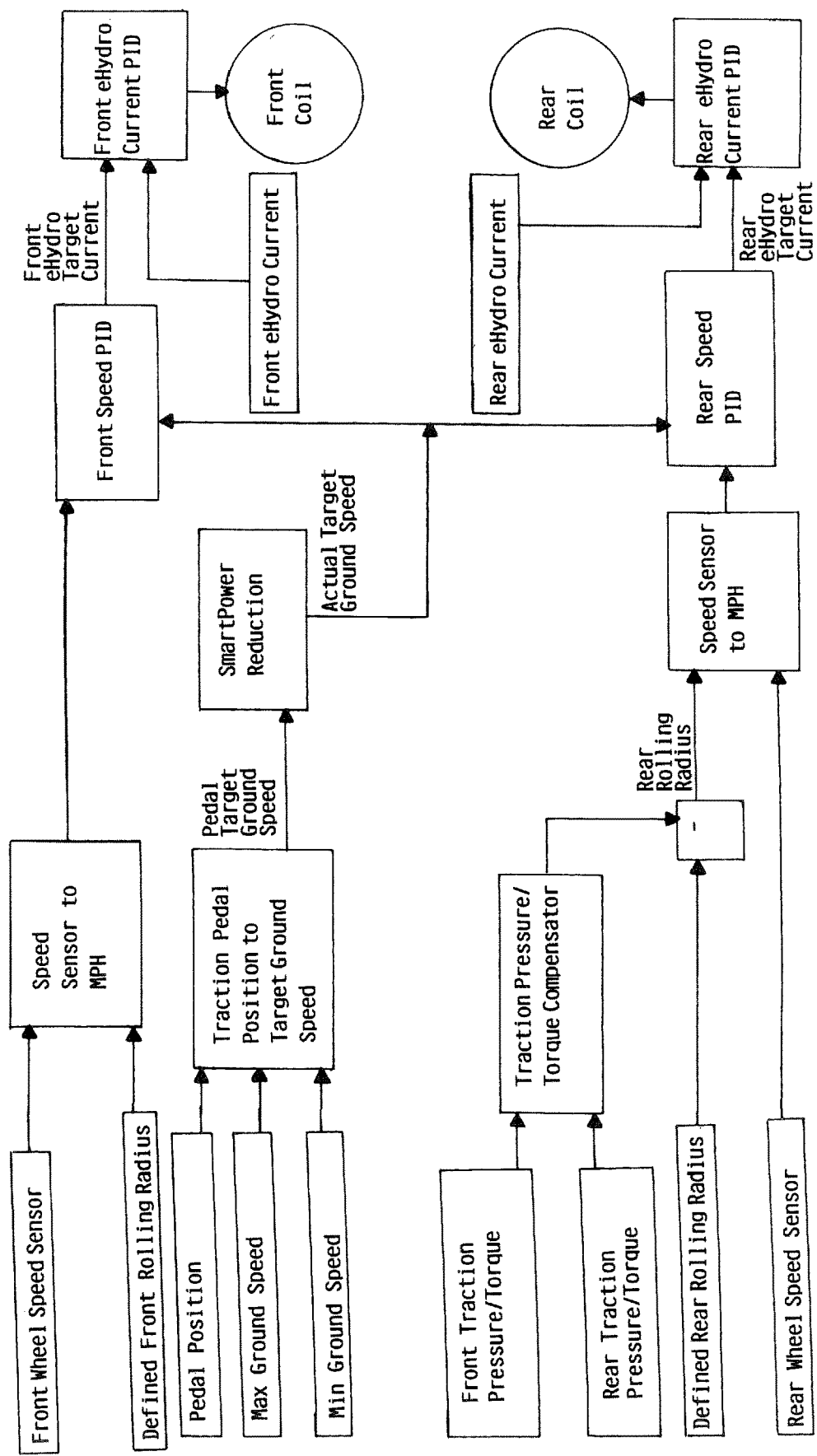
FIG. 7 is a control diagram of the hydraulic traction drive system of the tractor of FIG. 1.
Figure 8:
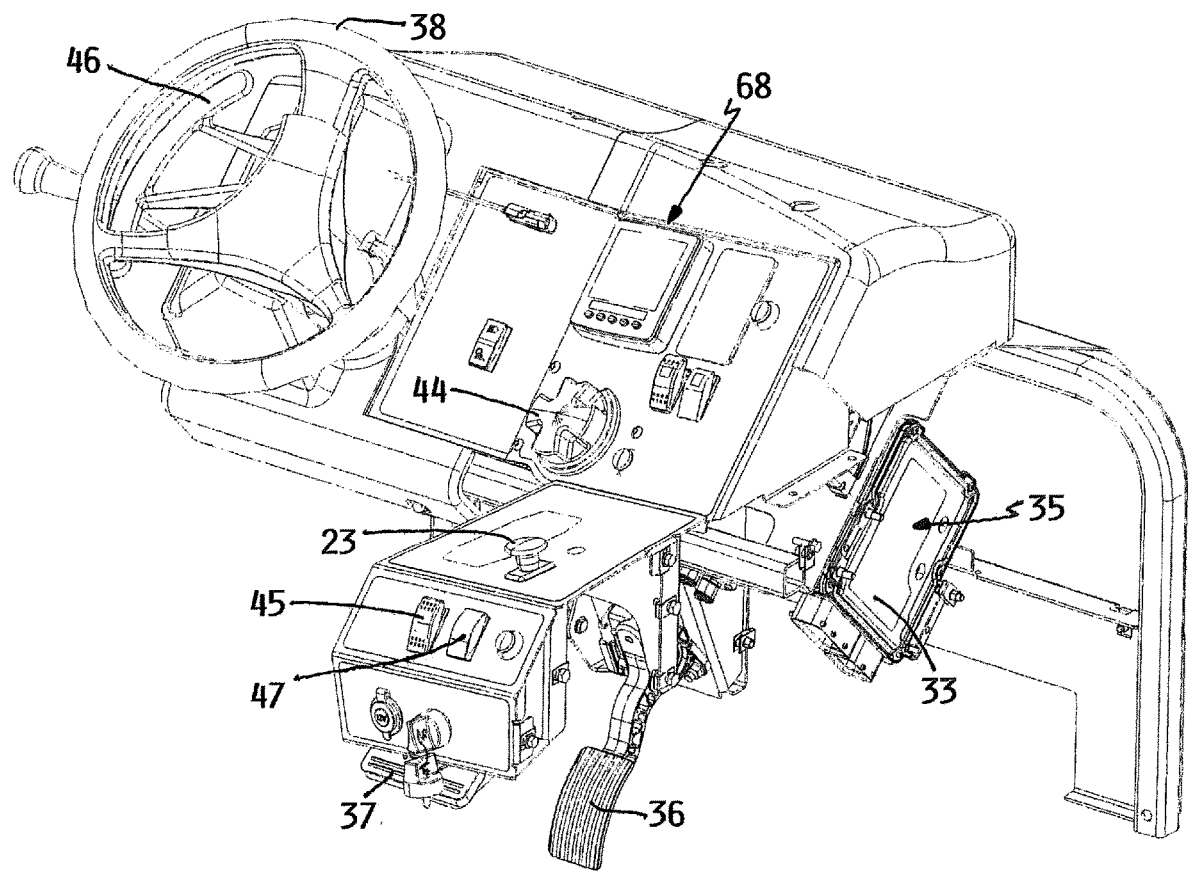
FIG. 8 is an enlarged perspective view similar to FIG. 4A of a portion of the operator compartment but taken from the opposite side thereof and with various side walls thereof having been removed to illustrate a portion of the control system of the vehicle.

FIG. 7 illustrates one possible implementation of the hydraulic traction drive system of this invention, including the use of the traction pressure compensation feature as described above. The torque produced by axles 32, 34 could be measured and used instead of pressure in the traction compensation feature to achieve the same traction system improvement benefits as described above. The block labeled SmartPower Reduction describes a ground speed adjustment that is made in accordance with engine loading as described in U.S. Pat. No. 8,880,300, which patent is hereby incorporated by reference.

Figure 4A:
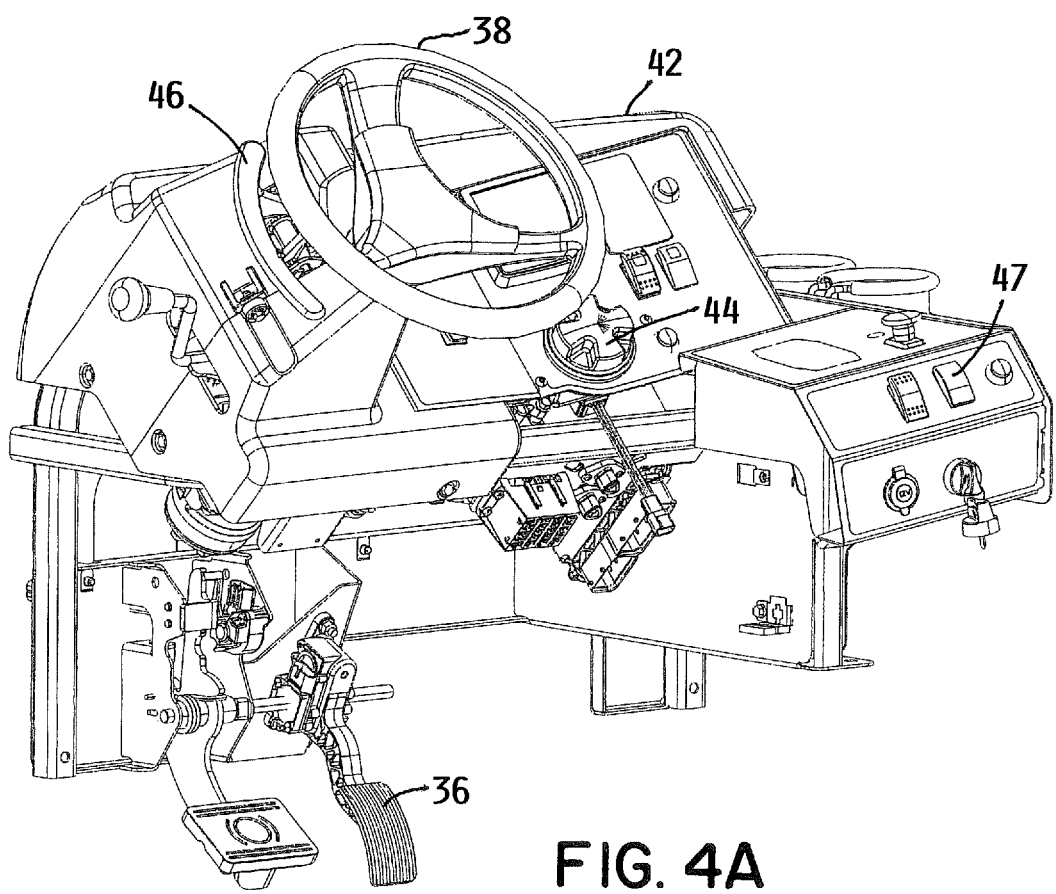
FIG. 4A is an enlarged perspective view of a portion of the operator compartment of the vehicle of FIG. 1, particularly illustrating the steering and operational controls used by the operator.

Referring now to FIG. 4A, the operator console 42 in front of the seated operator contains a mode selector 44 comprising a rotary knob which allows the operator to select various operational modes of vehicle 2. The modes comprise an automotive high mode, an automotive low mode, an attachment mode, an inch mode, a setup mode and potentially additional modes.

In the automotive high and low modes, the full range of accelerator pedal 36 will be available to the operator, but the maximum ground speed for vehicle 2 is different, e.g. 21 mph versus 8 mph. Thus, when the operator is pulling or carrying a load on vehicle 2, the operator can select the automotive low mode to limit the ground speed from the higher ground speed permitted in automotive high to ensure safety when transporting the load. The automotive low mode also changes the hydraulic motor displacement in the traction system to provide more torque for more capably transporting a heavy load. In the automotive low mode, the operator can still floor accelerator pedal 36 and hold it continuously depressed, but vehicle 2 will never exceed the safe speed of 8 mph for pulling or carrying a load. When vehicle 2 is simply being transported from one place to another without being loaded, the operator can select automotive high to allow a substantially higher transport speed. Again, the operator selects one mode or the other simply by turning mode selector 44 from one position to another. The maximum speeds available in automotive high or low can be selectively adjusted downwardly from the preset maximum speeds that are input during the setup mode to whatever lower speeds the operator or owner of vehicle 2 may choose to establish instead of using the preset maximum speeds originally preset in control system 35. Moreover, the preset maximum speeds as preset in control system 35 may have values other than 21 mph or 8 mph with the maximum speed in the automotive high mode set higher than the maximum speed in the automotive low mode.

The attachment mode is selected by the operator through manipulation of mode selector 44 when the operator is using vehicle 2 in conjunction with an attachment to perform some type of ground or turf grooming or working operation. The attachment mode allows the operator to select the attachment that will be carried on and operated by vehicle 2 from a menu of the attachments that have been previously setup in control system 35. This selection is done on a visual data entry device, such as a touch screen, by scrolling through the menu of possible attachments and by selecting the attachment that is intended to be used from that list. The same data entry device can be used to setup a particular attachment for use in a setup process that will be described hereafter. Once the operator has selected a particular attachment from the list as the one that will be carried on and operated by vehicle 2, the operational profile or instructions for operating vehicle 2 with such attachment will be used by control system 35.

The types of attachments which can be used on vehicle 2 comprise a rate dependent attachment in which the proper operation of the attachment is closely related to the speed of PTO 22 driving the implement on the attachment and the ground speed of vehicle 2, such as turf aeration, turf fertilization, spraying, and the like. A rate dependent attachment, particularly an aerator that is carried on three point linkage 20 and is driven by PTO 22, is the most demanding attachment typically used on vehicle 2 in terms of correlating the operation of the attachment to the operation of vehicle 2. A non-rate dependent attachment is one in which the proper operation of the implement on the attachment is generally dependent on the speed of the PTO with the ground speed of vehicle 2 being variable in relation to the speed of the PTO as long as sufficient PTO and ground speeds are present, such as mowing and debris blowing. Finally, some attachments can be operated while vehicle 2 is stationary and only PTO 22 is operated to drive the implement on the attachment, such as a generator, a pump for pumping water out of golf course bunkers, a wood chipper, and the like. This invention permits much easier operation in the rate dependent attachment mode as will be explained hereafter.

Mode selector 44 can be additionally positioned to select the inch mode. In the inch mode, the operator dismounts vehicle 2 and uses a tethered or vehicle mounted control to cause vehicle 2 to inch or creep forward or in reverse at a very low ground speed as the operator stands on the ground safely clear of vehicle 2. In addition, three point linkage 20 can be raised and lowered in the inch mode to help align three point linkage 20 with the corresponding pivot connections on the attachment as vehicle 2 creeps toward or away from the attachment. The inch mode is useful primarily in coupling the attachment to three point linkage 20 of vehicle 2 or when removing the attachment from three point linkage 20. In addition, PTO 22 may be operated while in inch mode by pressing and holding a PTO run button on the inch mode controller.

Besides mode selector 44, there is a paddle control 46 located on the other side of steering wheel 38 from mode selector 44. Paddle control 46 is pivotally mounted on the control console 42 for pivotal up and down motion. Paddle control 46 is formed as a portion of a circular arc and is normally spaced below the corresponding curved side of the rim of steering wheel 38 as shown in FIG. 4A. When an operator is gripping the left side of steering wheel 38 with the operator's left hand, the operator can reach down with the fingers of that hand and actuate paddle control 36 without entirely releasing the grip of his or her left hand from the rim of steering wheel 38 since paddle control 46 is sufficiently close to the rim to permit this to happen.

Figure 4B:
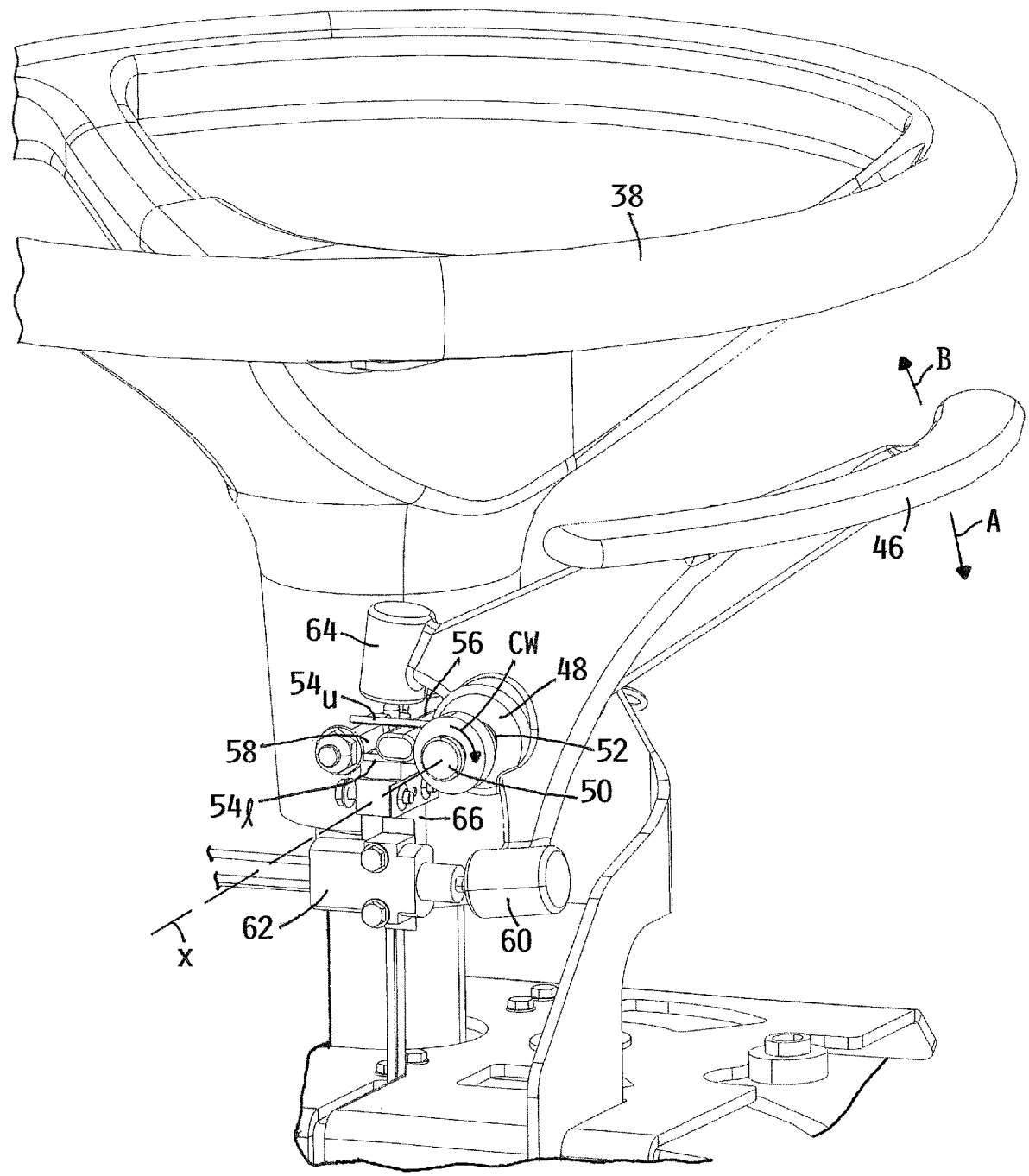
FIG. 4B is an enlarged perspective view of a portion of FIG. 4A, particularly showing the paddle control used by the operator to enter and exit a work operation.

Referring now to FIG. 4B, paddle control 46 includes a hub 48 that pivots around a generally fore-aft extending pivot axis x that is formed by the axis of a pivot 50 that is fixed on console 42 adjacent the steering column of steering wheel 38. Paddle control 46 is biased to a neutral position by a torsion spring 52 that is wrapped around pivot 50. The free upper and lower legs $54_u$ and $54_l$ of spring 52 extend to one side of pivot 50 to be adjacent the top and bottom sides of a fixed finger 56 of paddle control 46 as well as the top and bottom sides of a fixed stop 58 on console 42. FIG. 4B shows paddle control in its neutral position as normally provided by torsion spring 52.

When the operator so desires, the operator can reach down with the fingers of the operator's left hand and press down on the top of paddle control 46 to move paddle control 46 downwardly away from steering wheel 38 in the direction of arrow A in FIG. 4B. As the operator presses down, paddle control 46 rotates about pivot 50 in a clockwise direction CW in FIG. 4B. This rotation does two things. The rotation tensions torsion spring 52 since finger 56 raises upper leg $54_u$ of spring 52 upwardly while the lower leg $54_l$ of spring 42 remains in place against stop 58. In addition, the rotation also causes a first cylindrical abutment 60 that is part of paddle control 46 to similarly rotate to actuate a first sensor or switch 62 connected to control system 35 to signal to control system 35 that paddle control 46 has been pressed downwardly. As soon as the operator releases the momentary press down of paddle control 46 needed to actuate first switch 62, the increased tension in torsion spring 52 will pop or lift paddle control 46 back up to reset paddle control 46 to its neutral position. As will be explained in more detail hereafter, the press down actuation of paddle control 46 as just described in used by the operator to signal to control system 35 that a work operation of whatever work implement carried by vehicle 2 is to start. In this respect, the operator will have input into control system 35 through a data input device exactly what type of work implement is attached to three point hitch 20 of vehicle 2.

In addition to pressing down on paddle control 46 as described above, the operator can also use the fingers of his or left hand to grip paddle control 46 to pull up on paddle control 46 to move paddle control upwardly towards steering wheel 38 in the direction of arrow B in FIG. 4B. This action also increases the tension in torsion spring 52 similarly to that described above to provide a restoring force that pops or lowers paddle control 46 back down to its neutral position once the operator releases the upward pull on paddle control 46. In addition, the rotation also causes a second cylindrical abutment 64 that is part of paddle control 46 to similarly rotate to actuate a second sensor or switch 66 connected to control system 35 to signal to control system 35 that paddle control 46 has been pulled upwardly. The upward pull of paddle control 46 as just described is used by the operator to signal to control system 35 that a work operation of a work implement carried by vehicle 2 is to stop or terminate.

The downward press and upward pull actions imparted by the operator to paddle control 46 followed by the substantially immediate release of such actions have their most significant use in conjunction with the rate dependent attachment mode. As an example, let's consider the situation of vehicle 2 being equipped with a PTO powered aerator of conventional design and that control system 35 has been informed that such an aerator is attached to three point linkage 20. Such an aerator typically has an array of rotating coring tines disposed in various laterally extending rows for rotation about a horizontal axis. When the coring tines are rotated about such an axis, the rows of tines consecutively enter the ground to punch cylindrical openings in the turf and remove plugs of the turf to create an array of spaced holes in the turf. Such holes maintain the health of the turf and promote more grass growth as they relieve soil compaction and allow the entry of air, water and other soil nutrients. However, an operator must carefully follow a precise set of steps in the correct order to avoid doing serious damage to the turf surface when operating an aerator.

For example, when operating an aerator, the aerator must be rotating when it enters the ground and vehicle 2 must be moving forwardly when three point linkage 20 is lowered to place the aerator into engagement with the ground. Assume that the operator is driving vehicle 2 forwardly, but forgets to place the aerator into operation before he or she lowers three point linkage 20. When the stationary tines of the aerator are forced into the ground without the aerator being powered, the tines will act as plows and rip furrows in the turf surface. Or, assume that the aerator is under power and the operator lowers three point linkage 20 before placing vehicle 2 into forward motion. In this case, the rotating tines of the aerator will simply gouge or tear a large hole in the ground. In either case, the damage to the turf surface can be catastrophic, especially on a highly manicured turf surface such as a golf course fairway or the like, requiring expensive and time consuming repairs.

Moreover, a rate dependent attachment should only operate at a specific ground speed in a relation to a fixed PTO speed that drives the work implement to achieve the desired result, e.g. a desired fore-and-aft hole spacing in the case of an aerator or a desired application rate in the case of a fertilizer spreader or sprayer. Thus, an operator must maintain the speed of vehicle 2 at the specific desired speed during the work operation in order to avoid a poor result or potential damage to the turf surface from over-application of the fertilizer or the spray. This can be quite difficult to do especially for inexperienced operators. One important aspect of this invention is the automation of many of the tasks of operating rate dependent attachments that let the operator focus simply on driving vehicle 2 in a desired direction. In this aspect, paddle control 46 plays a role as explained hereafter.

As will be explained in more detail hereafter when describing the setup procedure for an attachment, control system 35 of vehicle 2 is programmed with a set of parameters for each rate dependent attachment that vehicle 2 is to be used with. Taking the example of the aerator again, the operator, or more typically the supervisor of the operator, can set the work ground speed and PTO speed at which vehicle 2 must be driven in order to achieve the desired hole spacing. For some operators, the supervisor may allow no variation in this pre-set ground speed. For other more skilled and trusted operators, the supervisor may allow the operator to increment or decrement the preset ground speed up or down depending upon the operator's judgment at the time. In this regard, a particular operator will have to log onto control system 35, either manually or through wireless electronic communication between control system 35 and an electronic device unique to the operator (e.g. radio-frequency identification (RFID), Bluetooth®, near-field communication (NFC), Wi-Fi™, and cell communication), to identify the operator to control system 35 to determine whether the specific operator using vehicle 2 has any such override capacity.

In addition to the parameters set by the supervisor, control system 35 will contain another set of stored parameters that are particular to the operation of the type of rate dependent attachment and that form an operational profile for such attachment. The type of rate dependent attachment that is to be used on vehicle 2 is identified to control system 35 by the operator. In the case of an aerator, these steps are required at the beginning of the work operation, namely turning on the aerator when three point linkage 20 is lifted above the ground or is between a maximum and minimum height relative to the ground to prevent damage from engaging the PTO too high or too low, ensuring that vehicle 2 is in motion before attempting to lower the three point linkage, and then lowering three point linkage 20 into contact with the ground. These three steps will be reversed at the end of the work operation, such as at the end of each pass when the operator must turn vehicle 2 around to make another pass in an adjacent swath. The downward press and upward pull actions of paddle control 46 is what allows the operator to signal to control system 35 to start the work operation and to stop the work operation.

For example, assuming the operator is ready to start a first pass in an aerating operation, the operator must place vehicle 2 in operation and head towards the starting point for such a pass. As the operator reaches the starting point, the operator can press down on paddle control 46 and then release paddle control 46 to signal to control system 35 the start of the work operation. Once control system 35 receives the lower three point hitch or start signal from paddle control 46, it detects that vehicle 2 is in motion from onboard sensors or other information, it sets the aerator into operation if vehicle 2 is in motion, and then and only then lowers the three point hitch to engage the aerator with the turf surface if vehicle 2 is in motion. The work ground speed and/or the speed of PTO 22 as preset by the operator or supervisor for such an aeration operation will then be automatically maintained by control system 35 in a fixed ratio corresponding to the desired rate as long as the operator depresses accelerator pedal 36 into some out of neutral position or engages an on/off cruise control button 45 on vehicle 2. In this instance, the engagement of cruise control button 45 by the operator does not attempt to maintain the ground speed at the instant cruise control button 45 was engaged as control system 35 will automatically maintain the preset work ground speed, but simply relieves the operator of having to maintain the accelerator pedal 36 in a depressed position.

In addition, for an operator who has been identified as a trusted or experienced operator by control system 35 when the operator logs into the system, a cruise control adjustment button 47 will retain its typical increment/decrement function to allow such a trusted operator to raise or lower the work ground speed during the work operation according to the operator's judgment. For an operator who is not experienced, the increment/decrement function of cruise control adjustment button 47 will be locked out during a work operation. Alternatively, control system 35 may be setup to allow the cruise control system to function as described above for every operator without the need for the operator to log in.

As the pass comes to an end and in preparation for turning around, the operator simply pulls upwardly on paddle control 46 and then releases paddle control 46 to signal to control system 35 the desired end or termination of the work operation. Again, control system 35 takes over and lifts the three point linkage out of the ground while the aerator is still operating and the vehicle is in forward motion and then potentially adjusts the PTO speed or shuts off the PTO to stop the aerator during the turnaround process. During a turnaround, if the cruise control system was engaged as described earlier, the ground speed of vehicle 2 as set during the rate controlled pass will be maintained. However, by stepping on accelerator pedal 36 during the turnaround, control of the accelerator pedal 36 reverts to normal to allow the operator to select any desired speed up to a preset maximum turnaround ground speed stored in control system 35 for use during a turnaround to allow the operator to more quickly maneuver and line up for the next pass. Once the turnaround is complete, and the operator is lined up to begin a new pass, the operator merely presses down on paddle control 46 again to enter the work operation once again and the correct three point lower sequence is used to avoid any damage to the turf surface.

During a turnaround operation, various parameters may be set as described later herein to prevent damage or excessive vibration when out of balance attachments are lifted above the ground. Such parameters may include limits to engine speed, ground speed, PTO shaft speed, and how high the three point linkage may be lifted on an attachment by attachment basis. Control system 35 will ensure that such limits when set for a particular attachment are not exceeded during the turnaround operation of vehicle 2 carrying such an attachment.

The obvious advantage in the automation of the work operation of rate dependent attachments is that the skill of the operator becomes less important to obtaining a good result. All the operator need do is to switch into and out of the work operation phase at the beginning and end of each pass using the press down and pull upward actions on paddle control 46 and control system 35 will automatically ensure that the lowering and lifting of the attachment (in the case of an attachment carried three point linkage 20) and the powering of the attachment through control of the work ground speed and work PTO speed to achieve a desired result (hole spacing in the case of an aerator or application rate in the case of a fertilizer, sprayer or the like) is appropriately taken care of without need for any other actions by the operator. All the operator really has to do is to be aware of his or her surroundings and to drive vehicle 2 safely and appropriately.

This means that a much larger group of operators will be able to consistently perform such rate dependent work operations in a safe and proper manner. Paddle control 46 is also used as described above when a non-rate dependent attachment, such as a mower, is coupled to three point linkage 20. For such an attachment, a downward push on paddle control 46 serves to lower three point linkage 20 and an upward pull on paddle control 46 serves to raise three point linkage 20. The fact that the down/up motions used on paddle control 46 mimic the desired down/up motions of three point linkage 20 and the fact that paddle control 46 is capable of fingertip actuation without releasing steering wheel 38 as described earlier makes paddle control easy and intuitive to use. Thus, paddle control 46 is not limited for use with rate dependent attachments but may be used as a manual three point linkage control for all attachments carried on three point linkage 20.

Referring now to FIG. 9, an information center 68 is linked to control system 35 for sending and receiving data and control information therebetween. Information center 68 has a visual display 70 and a row of navigational and data entry buttons 72 below display 70. Buttons 72 may be in the form of physical buttons that are separate from display 70. However, buttons 72 may also be embodied as virtual buttons that appear within display 70 when display 70 is in the form of a touch screen.

A wide variety of different types of attachments are possible for use with vehicle 2. Control system 35 controls the operation of vehicle 2 and in some cases the operation of the attachments depending upon the particular attachment that is carried on vehicle 2. Information center 68 is used as a data entry device to help an authorized person, such as a supervisor, to setup a profile for each different attachment that is to be used with vehicle 2. In one embodiment, that is done by having the authorized person answer a series of questions and input a series of variables through a menu based, interactive setup process stored within control system 2. Once a particular profile for a particular attachment has been set up, such a profile can be stored within control system according to an identifier assigned to the attachment and then used thereafter for such attachment. The interactive process employed will now be described in conjunction with FIGS. 10-13.

Figure 10:
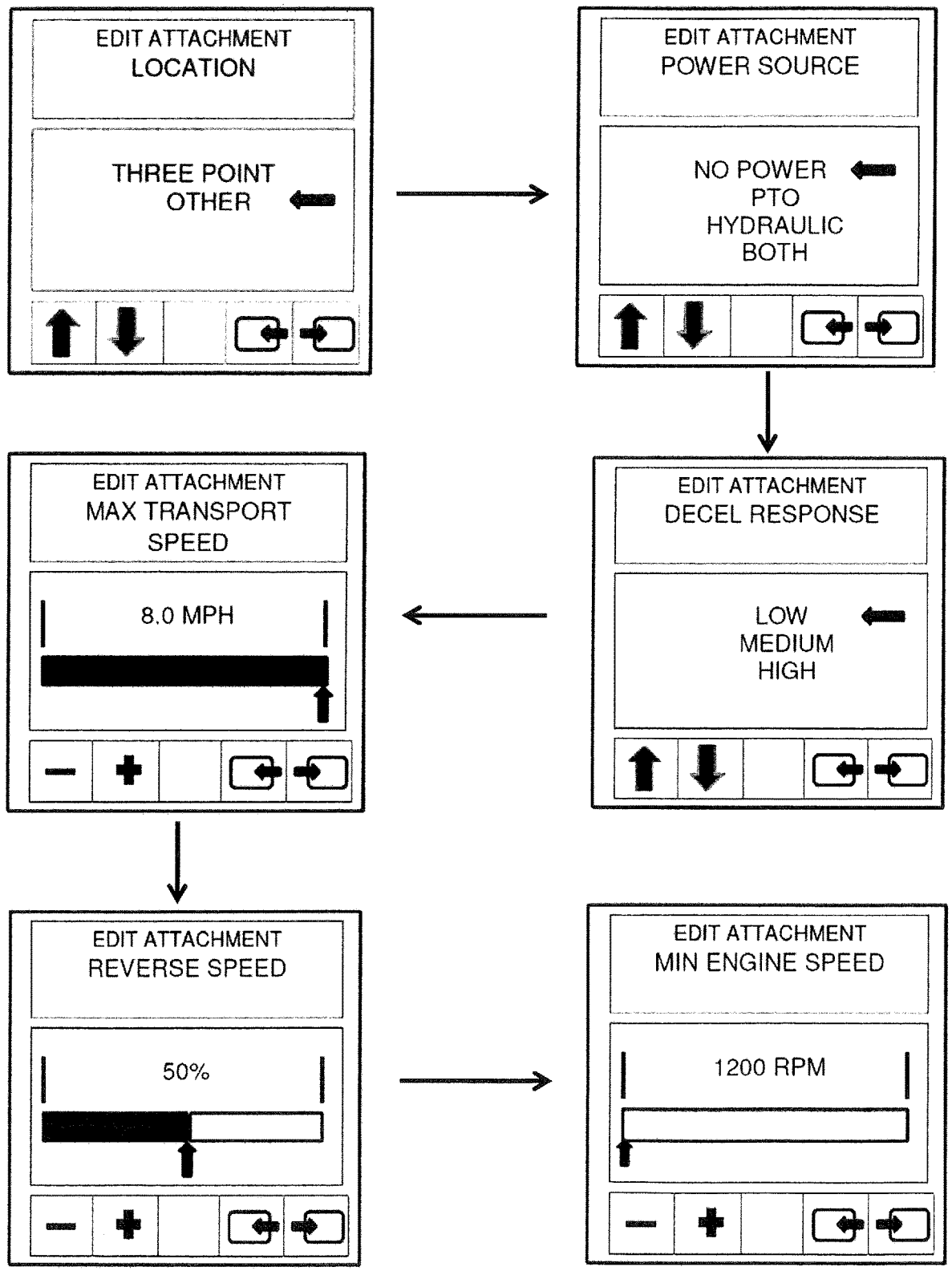
FIGS. 10-13 are flow charts representing a setup procedure to allow a plurality of different attachments to be used on vehicle 2 and properly operated by an operator and/or a microprocessor based control system.

In one embodiment of the invention, there are a series of basic questions that are answered for every attachment and a series of parameters that are entered for every attachment. Referring now to FIG. 10, a series of the screens of the information center are depicted.

As a preliminary matter, each screen has an upper box identifying the parameter that is to be setup. Some screens, such as the LOCATION and POWER SOURCE screens, have a middle section identifying the available choices in a list of choices. A user can scroll down through the list of choices using those input buttons contained on the information center below the up and down arrows shown on the screen until a selector on the screen, such as an arrow as depicted or alternatively a lighted horizontal band that highlights the choice, is adjacent the choice in the list which the operator wishes to select. The selection is then made by the user by pushing another of the buttons on the information center. After the selection is made, the next screen is displayed.

The screen also contains a number of forward and back screen icons positioned above other of the buttons on the information center. These buttons can be used to allow the operator to scroll back through previous screens from the current screen or to scroll forward through screens ahead of the previous screen. In addition, as shown in the MAX TRANSPORT SCREEN in FIG. 10, rather than use the relevant buttons to cross up and down through a list of choices, other screens have minus and plus icons above the same buttons to incrementally move a slider to extend or contract the length of a horizontal band within left and right boundaries for the band. This allows the user to select a particular value for a parameter within a range of values having an upper and lower limit.

With this background information out of the way, the specific parameters will now be described beginning with those shown in FIG. 10. FIG. 10 represents the set of parameters that are typically selected for every attachment used on vehicle 2.

LOCATION selects where the attachment is coupled to vehicle 2. The choices are either THREE POINT to select a coupling to three point linkage 20 or OTHER to select any other location, such as drawbar 21, on the rear bed of vehicle behind the operator compartment, or at any other spot on vehicle 21 (e.g., a hydraulically powered loader attached to the frame of vehicle 2).

POWER SOURCE selects how the attachment is powered by vehicle 2. The choices are either NO POWER to select an attachment that is not positively powered by vehicle 2 other than for being moved or propelled through movement of vehicle 3, PTO to select an attachment coupled to PTO 22 for being powered thereby, HYDRAULIC to select an attachment coupled to the hydraulic system of vehicle 2 through connectors 28a, 28b, or BOTH to select an attachment that is coupled to both PTO 22 the hydraulic system of vehicle 2 (such as a mower in which the blades are powered by PTO 22 but having wing decks that are hydraulically lifted and lowered) or when two different attachments are carried on vehicle 2 at the same time (such as a front mounted hydraulic powered snowblower and a rear mounted PTO driven salt spreader).

DECEL RESPONSE selects how quickly vehicle 2 is allowed to decelerate for the particular attachment being set up once the operator releases traction pedal 36 and vehicle 2 begins to coast to a stop. The choices are either LOW for a gradual deceleration, MEDIUM for a less gradual deceleration and HIGH for the quickest stop. Of course, the user may always operate brake pedal 37 to bring vehicle 2 to a stop independently of vehicle 2 coasting to a stop.

MAX TRANSPORT SPEED selects the maximum transport speed for vehicle 2 for the particular attachment being setup. The choice is in discrete increments (e.g. 0.1 mph increments) between a lower limit (e.g. 0.5 mph) and an upper limit (e.g. 8 mph as depicted). For a powered attachment, the MAX TRANSPORT SPEED setting that is input in this step is effective during operation of the attachment only if the powered inputs to the attachment from PTO 22 or through hydraulic system connectors 28*a*, 28*b* are off.

REVERSE SPEED selects how fast vehicle 2 may be driven in reverse for the particular attachment being set up. The choice is in discrete increments (e.g. 10% increments) between a lower limit (e.g. 10%) and an upper limit (e.g. 100%) of the MAX TRANSPORT SPEED setting. In FIG. 10, with the MAX TRANSPORT SPEED setting being 8 mph, the 50% REVERSE SPEED setting would equate to a maximum speed in reverse of 4 mph for vehicle 2.

MIN ENGINE SPEED selects how fast vehicle 2 idles when the particular attachment being set up is carried on vehicle 2. The choice is in discrete increments (e.g. 100 rpm increments) between a lower limit (e.g. 1200 rpm) and an upper limit (e.g. 3000) rpm. By being able to adjust the idle speed to a sufficient level, vehicle 2 when carrying a heavy attachment will be able to accelerate from a stopped position at a usual rate rather than having its acceleration be significantly retarded or delayed.

FIG. 10 represents the attachment setup process for the simplest attachments used with vehicle 2. Such attachments are those not carried on three point linkage 20 and that receive no power from vehicle 2 for operation other than for the fact that they are carried by vehicle 2 for movement over the ground as vehicle 2 is driven over the ground. That is why the first two screens in FIG. 10 show the OTHER and NO POWER choices as having been selected. For this type of simple attachment, the attachment setup process walks the user through the screens of FIG. 10 to setup the operational parameters for the attachment in an operational profile. Once the parameters have been set up, they may be stored in the memory of control system 35 by the user under an identifier input by the user (e.g. the attachment name). Then, when such an attachment is thereafter coupled to vehicle 2, the operator need only identify what attachment is being used with vehicle 2. Thereafter, control system 35 will control the operation of vehicle 2 and the attachment through the stored operational profile for such attachment.

Figure 11:
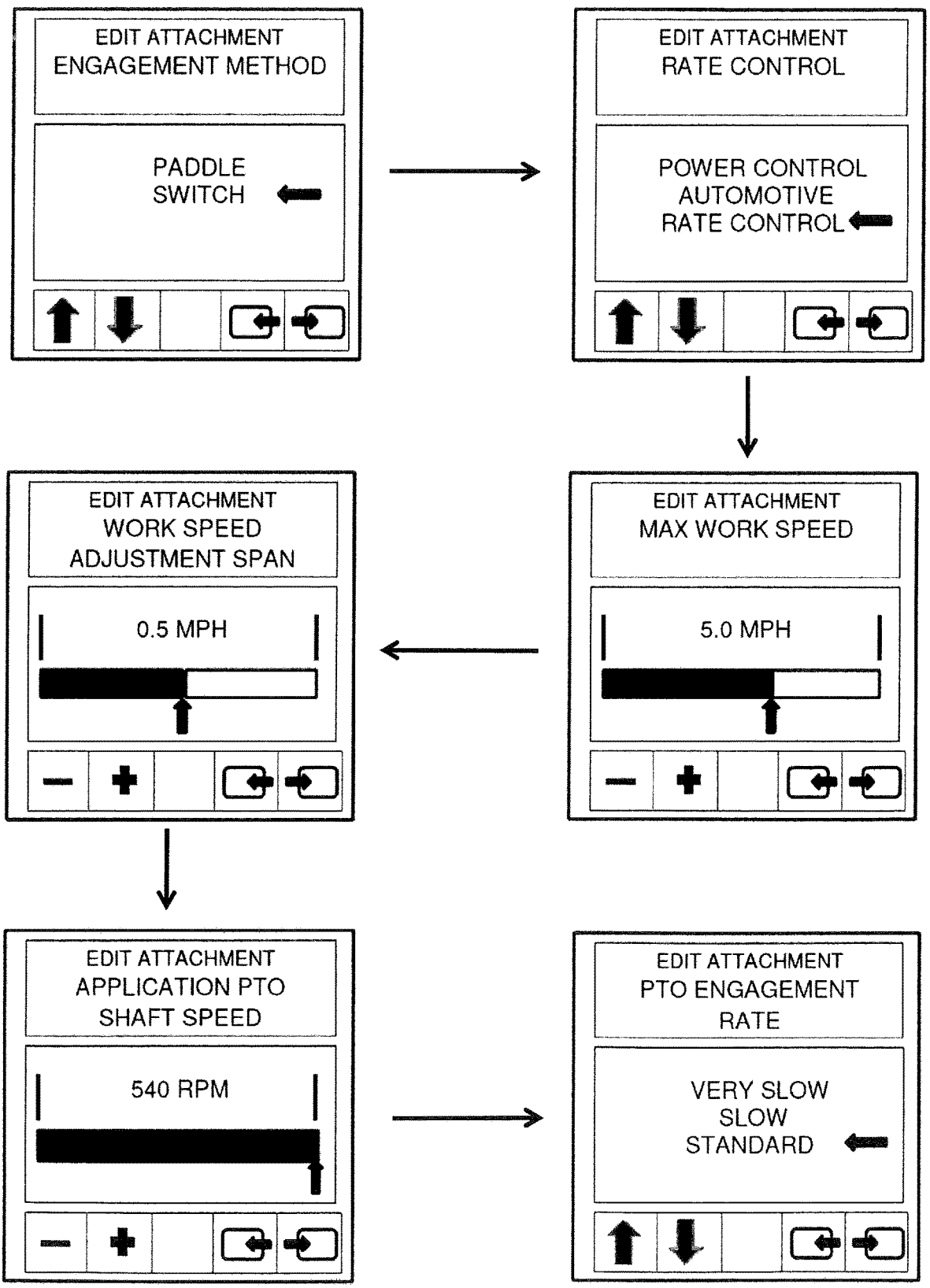

The setup process has additional screens for inputting additional parameters for attachments that are powered by PTO 22 or the hydraulic system through connectors 28*a*, 28*b* or that are coupled to three point linkage 20. Of course, the first two screens in FIG. 10 would have had different choices selected in whole or in part than what is shown in FIG. 10. If the attachment is mounted on three point linkage 20, the THREE POINT choice in the first screen of FIG. 10 would have been selected rather than OTHER. Similarly, with a powered attachment, the NO POWER choice in the second screen of FIG. 10 would have been bypassed in favor of one of the three remaining choices. Let's suppose another attachment to be setup is one that is still carried on vehicle 2 in the OTHER location but that is powered either by PTO 22 or the hydraulic system of vehicle 2. In this case, FIG. 11 illustrates the following additional screens that apply during the setup process as follows below.

ENGAGEMENT METHOD selects how the user intends to engage and disengage the PTO and hydraulic power systems of vehicle 2 for the particular attachment being set up. The choices are either PADDLE representing use of paddle control 46 by the operator or SWITCH representing use by the operator of the manually operable PTO switch 23 and hydraulic lever 29 in the operator's compartment. PADDLE is primarily used with respect to attachments carried on three point linkage 20 but may be used with other attachments if so desired.

RATE CONTROL selects how the ground speed and engine speed are controlled with respect to one another during operation for the particular attachment being set up. RATE CONTROL APPLIES when the attachment is in a work operation or in a turnaround operation. The choices are POWER CONTROL in which the ground speed of vehicle 2 varies with movement of traction pedal 36 but engine speed is locked at a predetermined level, AUTOMOTIVE in which both the ground speed of vehicle 2 and the engine speed are variable through traction pedal 36 in the manner of an automobile (one increases ground speed by increasing engine speed and vice versa), and RATE CONTROL in which ground speed and engine speed are not variable through traction pedal 36 but are maintained by control system 35 in a fixed ratio to keep an operational rate of a rate dependent attachment substantially constant at a predetermined rate (e.g. hole spacing for an aerator, a substance application rate for a fertilizer spreader, topdresser, sprayer or the like).

MAX WORK SPEED selects the maximum ground speed for vehicle 2 for the particular attachment being setup when such attachment is actively performing the ground or turf grooming operation for which it was designed, e.g. an aerator is aerating the ground or a mower is cutting the grass. The choice is in discrete increments (e.g. 0.1 mph increments) between a lower limit (e.g. 0.5 mph) and an upper limit comprising the MAX TRANSPORT SPEED as input in the MAX TRANSPORT SPEED step of FIG. 10. In the examples of FIGS. 10 and 11, MAX WORK SPEED has been limited to 5 mph in FIG. 11 when MAX TRANSPORT SPEED was limited to 8 mph in FIG. 10.

MIN WORK SPEED (not shown in FIG. 10 since the screen therefor is substantially identical to the screen for MAX WORK SPEED) selects the minimum work speed for vehicle 2 for the particular attachment being setup when such attachment is actively performing the ground or turf grooming operation for which it was designed. There are two differences between MIN WORK SPEED and MAX WORK SPEED. First, in MIN WORK SPEED, the upper limit comprises MAX WORK SPEED. Second, in MIN WORK SPEED control system 35 does not actively control the ground speed of vehicle 2 to maintain the ground speed at MIN WORK SPEED should the ground speed reach MIN WORK SPEED. Instead, control system 35 only provides an alert to the operator if the ground speed of vehicle 2 has dropped below MIN WORK SPEED to provide the operator with the opportunity to speed vehicle 2 up through use of traction pedal 36 should the operator choose to do so.

WORK SPEED ADJUSTMENT SPAN selects how much a trusted or authorized operator who is operating vehicle 2 when it is operating the particular attachment being setup will be allowed to vary the MAX WORK SPEED through the exercise of the operator's judgment based on his or her expertise or experience. For example, when operating a powered aerator, a trusted or authorized operator may judge the hole spacing to be not quite right and wish to either increase or decrease the ground speed of vehicle 2 on the fly from the MAX WORK SPEED. The amount of leeway the operator has to make this adjustment is governed by the WORK SPEED ADJUSTMENT SPAN setting. The choice in the WORK SPEED ADJUSTMENT SPAN is in discrete increments (e.g. 0.1 mph) between a lower limit (e.g. 0.0 mph) and an upper limit (e.g. 1.0 mph) on either side of the MAX WORK SPEED setting to enable up to a 1.0 mph decrease or up to a 1.0 mph increase. WORK SPEED ADJUSTMENT SPAN is setup only when RATE CONTROL has been selected in the RATE CONTROL setting.

APPLICATION PTO SHAFT SPEED selects how fast PTO 22 will be driven when vehicle 2 is operating the particular attachment being setup. The choice in the APPLICATION PTO SHAFT SPEED is in discrete increments (e.g. 5 rpm) between a lower limit (e.g. PTO shaft speed of 180 rpm) and an upper limit (e.g. PTO shaft speed of 540 rpm). Selecting a particular PTO SHAFT SPEED setting will cause control system 35 to automatically set an appropriate engine speed. APPLICATION PTO SHAFT SPEED is setup whenever PTO or BOTH are selected in the POWER SOURCE screen of FIG. 10.

In the event HYDRAULIC is selected in the POWER SOURCE screen of FIG. 10, a similar APPLICATION HYDRAULIC ENGINE SPEED screen (not shown) will be used in place of the APPLICATION PTO SHAFT SPEED screen. APPLICATION HYDRAULIC ENGINE SPEED selects the engine speed used for powering the hydraulic system loads imposed by the attachment that is being setup. The choice for APPLICATION HYDRAULIC ENGINE SPEED is in discrete increments (e.g. 100 engine rpm) between a lower limit (1200 engine rpm) and an upper limit (3000 engine rpm).

Figure 12:
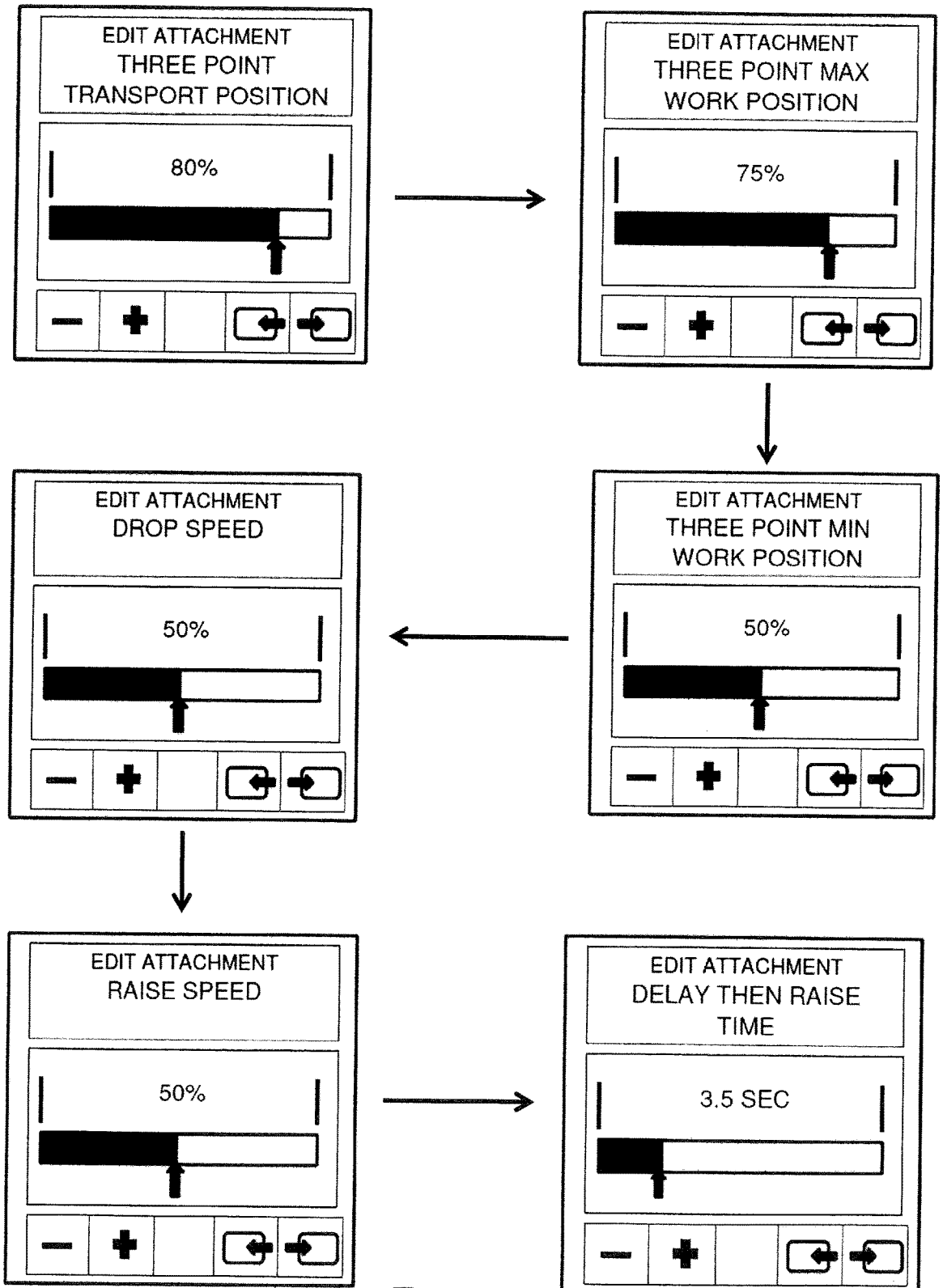
Figure 13:
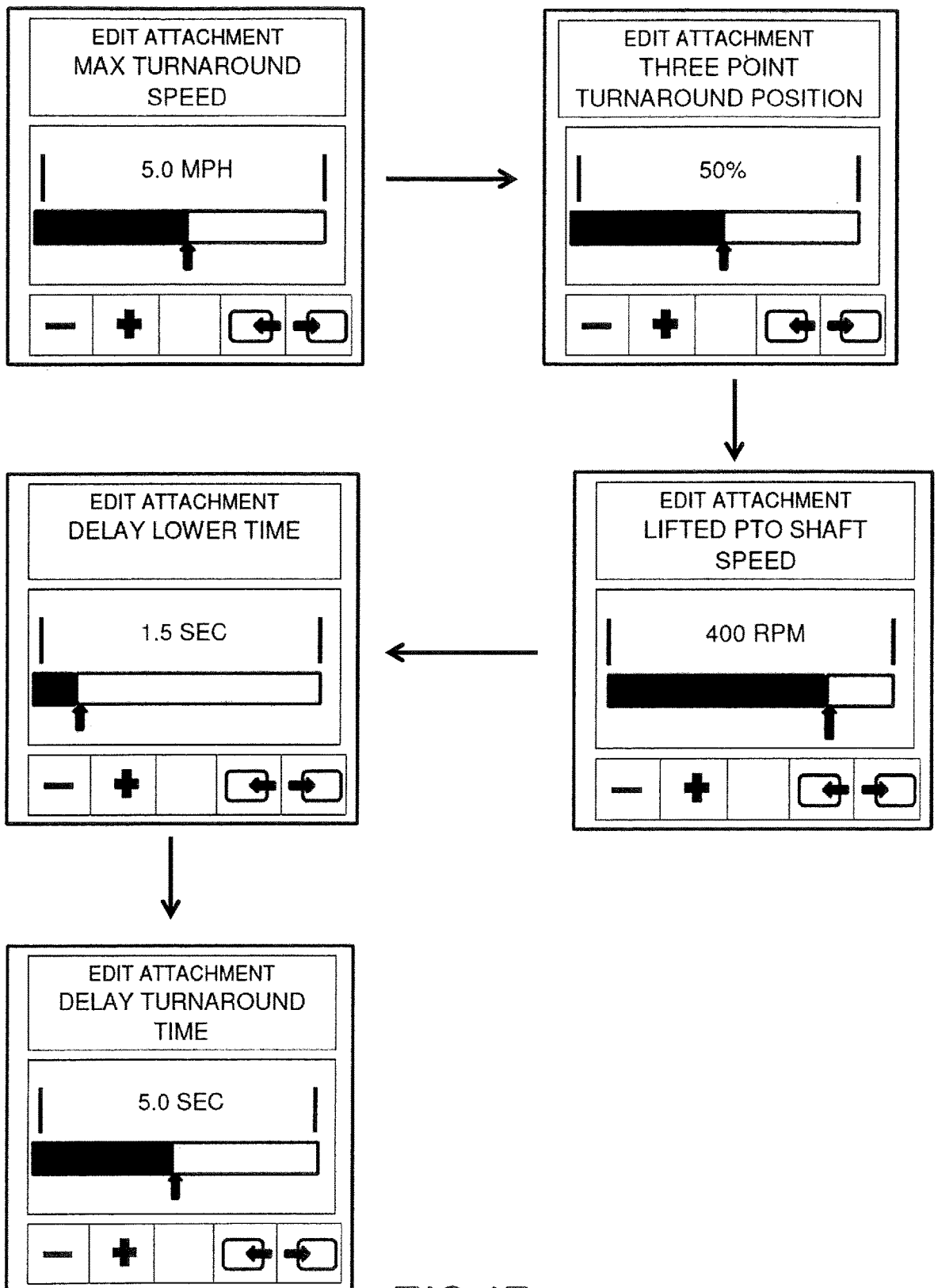

If a powered attachment is carried on three point linkage 20, additional steps will be required in the attachment setup process. These steps are illustrated in FIG. 12 as described below.

THREE POINT TRANSPORT POSITION selects how high the attachment being set up can be raised when the attachment is lifted by three point linkage 20 for transport purposes from one location to another rather than for work purposes. The choice in THREE POINT TRANSPORT POSITION is in increments (e.g. 1% increments) between a lower limit (e.g. 0% representing the lowest reading provided by a sensor whose readings vary with the height of three point linkage 20) and an upper limit (e.g. 100% representing the highest reading of the same sensor).

THREE POINT MAX WORK POSITION selects how high the attachment being set up can be raised by three point linkage 20 when such attachment is actively performing the ground or turf grooming operation for which it was designed. The choice in THREE POINT MAX WORK POSITION is in increments (e.g. 1% increments) between a lower limit (e.g. 0% representing the lowest possible position three point linkage 20 can have on vehicle 2) and an upper limit (e.g. 100% representing the THREE POINT TRANSPORT POSITION height). If the operator attempts to raise the attachment beyond the THREE POINT MAX WORK POSITION setting, the raise sequence for the PTO will be disabled.

THREE POINT MIN WORK POSITION selects how low the attachment being set up can be lowered by three point linkage 20 when such attachment is actively performing the ground or turf grooming operation for which it was designed. The choice in THREE POINT MIN WORK POSITION is in increments (e.g. 1% increments) between a lower limit (e.g. 0% representing the lowest possible position three point linkage 20 can have on vehicle 2) and an upper limit (e.g. 100% representing the THREE POINT MAX WORK POSITION height). If the operator attempts to lower the attachment below the THREE POINT MIN WORK POSITION setting, the lower sequence for the PTO will be disabled.

DROP SPEED selects how quickly the attachment being set up can be lowered by three point linkage 20 when such attachment is carried by three point linkage. The choice is in discrete increments (e.g. 10% increments) between a lower limit of 10% and an upper limit of 100%. Certain attachments, such as light attachments, can often be dropped more quickly than other attachments, such as heavy attachments, without risk of damage to the attachments or vehicle 2 or the ground or turf surface. This screen allows the user to tailor DROP SPEED to the characteristics of the particular attachment being set up.

RAISE SPEED selects how quickly the attachment being set up can be raised by three point linkage 20 when such attachment is carried by three point linkage. The choice is in discrete increments (e.g. 10% increments) between a lower limit of 10% and an upper limit of 100%.

DELAY THEN RAISE TIME selects a period of time in which the raising of three point linkage 20 is delayed to allow the PTO shaft to stop spinning when PTO or BOTH has been selected in the POWER SOURCE screen. The choice is in discrete increments (e.g. 0.1 seconds) from a lower limit (e.g. 0.0 seconds) and an upper limit (e.g. 25 seconds). As a practical matter, this setting for most attachments will most likely be set somewhere between 1.0 and 3.0 seconds.

Finally, we will turn to the situation of an attachment, such as a powered aerator for providing aeration holes in the ground or turf surface, which is to be controlled by the operation of paddle control 46. This is an attachment which benefits from the operation of paddle control 46 to automate some of the tasks of safely and correctly operating such an aerator as set forth earlier herein. Use of paddle control 46 is selected by selecting PADDLE in the ENGAGEMENT METHOD screen.

To repeat the advantage of control through paddle control 46, the operator need only press down on paddle control 46 at the beginning of a pass. Control system 35 will first engage the power source for the aerator and to bring the coring implements up to speed and then lower three point linkage 20 to engage the aerator with the ground or turf surface as vehicle 2 continues to move. At the end of a pass and before executing a turnaround of vehicle 2 to begin a new pass, the operator pulls up on paddle control. In response, control system 35 lifts the three point linkage 20 to pull the powered aerator up out of engagement with the ground or turf surface while vehicle 2 is still moving and then disengages power to the aerator after it is clear of the ground unless the THREE POINT MAX WORK POSITION is higher than the THREE POINT TURNAROUND POSITION to be described later. This prepares vehicle 2 and the aerator attachment for the operator to manually turn vehicle 2 around to line up for a new pass adjacent to the pass that was just finished.

By having control system 35 automate these operational steps other than for the down and up signals provided by the down and up motion of paddle control 46 by the operator, there is an additional group of less experienced or less skilled operators who can operate vehicle 2. The operators in this group need not have the skill or experience needed to properly and in the right order manually execute the operational steps needed for the aerator at the beginning and end of each pass. Control system 35 now does that for the operator. With that having been said, the additional setup procedure steps involved when PADDLE has been selected is set forth in the following description and in conjunction with FIG. 13.

MAX TURNAROUND SPEED selects the maximum speed for vehicle 2 for the particular attachment being setup during a turnaround of vehicle 2. The choice is in discrete increments (e.g. 0.1 mph increments) between a lower limit (e.g. 0.5 mph) and an upper limit (e.g. MAX TRANSPORT SPEED).

THREE POINT TURNAROUND POSITION selects how high the attachment being set up will be raised by three point linkage 20 when such attachment is carried by vehicle 2 and vehicle 2 is being turned around by the operator. The choice in THREE POINT TURNAROUND POSITION is in increments (e.g. 1% increments) between a lower limit (e.g. 0% representing the lowest possible position three point linkage 20 can have on vehicle 2) and an upper limit (e.g. 100% representing the THREE POINT TRANSPORT POSITION height).

LIFTED PTO SHAFT SPEED selects the same parameter in the same manner as was earlier described with respect to APPLICATION PTO SHAFT SPEED except that it selects the PTO SHAFT SPEED that is to be used during a turnaround operation. Typically, LIFTED PTO SHAFT SPEED would be lower than APPLICATION PTO SHAFT SPEED. Similarly, the earlier description of APPLICATION HYDRAULIC ENGINE SPEED would apply in a screen entitled LIFTED HYDRAULIC ENGINE SPEED except that the selection is now for the engine speed to be used during a turnaround operation.

DELAY LOWER TIME SELECTS a time period that delays the lowering of the attachment being set up after the power source for such an attachment is enabled to ensure that the work implement of the attachment, e.g. the rotatable coring tine array of an aerator, gets up to speed before the attachment is lowered into the ground. The choice is in discrete increments (e.g. 0.1 seconds) from a lower limit (e.g. 0.0 seconds) and an upper limit (e.g. 25 seconds). As a practical matter, this setting for most attachments will most likely be set somewhere between 1.0 and 3.0 seconds.

Finally, assume an operator has used paddle control 46 to initiate a pass and in the middle of a pass sees an obstruction such as a sprinkler head in a golf course fairway. The operator may wish to quickly raise and then almost immediately lower an attachment that would otherwise hit and damage the sprinkler head but without entering into turnaround mode. DELAY TURNAROUND TIME lets the operator accomplish this as it selects a delay period after three point linkage 20 reaches the THREE POINT TURNAROUND POSITION before control system 35 enters the turnaround mode control as long as the operator toggles paddle control 46 back down before the DELAY TURNAROUND TIME period expires.

Accordingly, DELAY TURNAROUND TIME selects the duration of the delay that control system 35 uses after an up signal from paddle control 46 before it enters the turnaround mode. The choice is in discrete increments (e.g. 0.1 seconds) from a lower limit (e.g. 0.0 seconds) and an upper limit (e.g. 25 seconds). As a practical matter, this setting for most attachments will most likely be set somewhere well below 25 seconds as the operator can lift the attachment, pass the sprinkler head or other obstruction, and lower the attachment well before 25 seconds times out.

This invention is not to be limited to the particulars of the embodiment described herein. Further, the various features described herein, e.g. the overall layout of vehicle 2, the four wheel steering feature, the hydraulic traction drive system with and without the pressure compensation feature, the rear and side dumping capability, and the automation of the work operation for rate dependent attachments through control system 35 and paddle control 46, need not be used together all in one embodiment, but may also be used entirely separately from one another or in different combinations thereof in other embodiments.

Accordingly, the scope of the invention is to be limited only by the following claims.

The invention claimed is:

1. An outdoor power equipment vehicle for performing grooming or working operations on a ground or turf surface, which comprises:
    (a) a frame carrying a prime mover and being supported for movement over the ground or turf surface by a pair of front wheels and a pair of rear wheels, at least one pair of wheels being steerable and at least one pair of wheels being driven by a traction drive system powered from the prime mover, the frame having a three point linkage for carrying a rate dependent attachment whose operation on the surface is dependent upon maintaining a ground speed of the vehicle in a fixed relationship to an operational speed of an implement on the attachment that performs the operation on the surface;
    (b) a control manually operable by an operator during operation of the vehicle to send a first signal and a second signal; and
    (c) a control system that receives the first and second signals and that automatically maintains the fixed relationship between the ground speed and operational speed of the implement upon receipt of the first signal and discontinues the fixed relationship after receiving the second signal.

2. The vehicle of claim 1, further including a steering wheel for allowing the operator to steer the at least one pair of steerable wheels, and wherein the control is adjacent the steering wheel and is vertically movable in an up and down manner to generate the first and second signals.

3. The vehicle of claim 2, wherein the control has an arcuate shape that mimics a curvature in a rim of the steering wheel and an arcuate length that comprises only a portion of a circumference of the rim of the steering wheel.

4. The vehicle of claim 2, wherein the control is positioned beneath the steering wheel and is close enough to a rim of the steering wheel that the operator may actuate the control in both its up and down motions using one or more fingers on one hand of the operator that is gripping the rim of the steering wheel without releasing the one hand of the operator from the rim of the steering wheel.

5. The vehicle of claim 1, wherein the control system, upon receipt of the first signal, automatically lowers the three point linkage and upon receipt of the second signal, automatically raises the three point linkage to lower and raise the rate dependent attachment carried on the three point linkage.

6. The vehicle of claim 5, wherein the control system, upon receipt of the first signal, automatically begins powered operation of the implement on the attachment if the vehicle is in motion before lowering the three point linkage and upon receipt of the second signal, automatically ends powered operation of the implement on the attachment after raising the three point linkage.

7. The vehicle of claim 6, wherein the control system, after receiving the first signal, determines that powered operation of the implement has begun and that the vehicle is in motion before it lowers the three point linkage.

8. The vehicle of claim 7, wherein the attachment is an aerator and the implement comprises an array of rotatable tools for creating aeration holes in the ground or turf surface.

9. An outdoor power equipment vehicle for performing grooming or working operations on a ground or turf surface, which comprises:
    (a) a frame carrying a prime mover and being supported for movement over the ground or turf surface by a pair of front wheels and a pair of rear wheels, at least one pair of wheels being steerable by an operator through the operation of a steering wheel and at least one pair of wheels being driven by a traction drive system powered by the prime mover, the frame having a three point linkage for carrying an attachment for performing the grooming or working operations on the ground or turf surface, the three point linkage capable of being raised and lowered relative to the frame by at least one actuator carried on the frame and coupled to the three point linkage; and (b) a control adjacent the steering wheel and manually operable by the operator of the vehicle to raise and lower the three point linkage by up and down motions of the control respectively, wherein the control is positioned beneath the steering wheel and is close enough to a rim of the steering wheel that the operator may actuate the control in both its up and down motions using one or more fingers on one hand of the operator that is gripping the rim of the steering wheel without releasing the one hand of the operator from the rim of the steering wheel;

(c) wherein when the operator presses down on the control, the control moves downwardly away from the steering wheel, and wherein the downward movement of the control initiates actuation of a first sensor connected to a control system, the first sensor signaling the control system to begin operation of the attachment.

10. The vehicle of claim 9, wherein the control has an arcuate shape that mimics a curvature in the rim of the steering wheel and an arcuate length that comprises only a portion of a circumference of the rim of the steering wheel.

11. The vehicle of claim 9, wherein the control is located to the left of the steering wheel.

12. The vehicle of claim 9, wherein when the operator pulls up on the control, the control moves upwardly towards the steering wheel.

13. The vehicle of claim 12, wherein the upward movement of the control initiates actuation of a second sensor connected to the control system, the second sensor signaling the control system to terminate operation of the attachment.

14. An outdoor power equipment vehicle for performing grooming or working operations on a ground or turf surface, which comprises:

(a) a frame carrying a prime mover and being supported for movement over the ground or turf surface by a pair of front wheels and a pair of rear wheels, at least one pair of wheels being steerable by an operator through the operation of a steering wheel and at least one pair of wheels being driven by a traction drive system powered by the prime mover, the frame having a three point linkage for carrying an attachment for performing the grooming or working operations on the ground or turf surface, the three point linkage capable of being raised and lowered relative to the frame by at least one actuator carried on the frame and coupled to the three point linkage; and (b) a control adjacent the steering wheel and manually operable by the operator of the vehicle to raise and lower the three point linkage by up and down motions of the control respectively, wherein the control is positioned beneath the steering wheel and is close enough to a rim of the steering wheel that the operator may actuate the control in both its up and down motions using one or more fingers on one hand of the operator that is gripping the rim of the steering wheel without releasing the one hand of the operator from the rim of the steering wheel;

c) wherein when the operator pulls up on the control, the control moves upwardly towards the steering wheel, and wherein the upward movement of the control initiates actuation of a second sensor connected to a control system, the second sensor signaling the control system to terminate operation of the attachment.

15. The vehicle of claim 14, wherein the control has an arcuate shape that mimics a curvature in the rim of the steering wheel and an arcuate length that comprises only a portion of a circumference of the rim of the steering wheel.

16. The vehicle of claim 14, wherein the control is located to the left of the steering wheel.

17. The vehicle of claim 14, wherein when the operator presses down on the control, the control moves downwardly away from the steering wheel.

* * * * *